United States Patent
Watanabe et al.

(10) Patent No.: US 9,658,428 B2
(45) Date of Patent: May 23, 2017

(54) OPTICAL INSTRUMENT AND CONTROL METHOD FOR LENS

(71) Applicant: Olympus Corporation, Shibuya-ku, Tokyo (JP)

(72) Inventors: Kazuo Watanabe, Hachioji (JP); Keita Imai, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/946,221

(22) Filed: Nov. 19, 2015

(65) Prior Publication Data

US 2016/0147040 A1 May 26, 2016

(30) Foreign Application Priority Data

Nov. 26, 2014 (JP) .................. 2014-239031

(51) Int. Cl.
*G02B 7/28* (2006.01)
*G03B 3/10* (2006.01)

(52) U.S. Cl.
CPC .............. *G02B 7/282* (2013.01); *G03B 3/10* (2013.01)

(58) Field of Classification Search
USPC ......................................................... 396/81
See application file for complete search history.

(56) References Cited

U.S. PATENT DOCUMENTS

| 5,202,717 | A | 4/1993 | Ookubo et al. | |
| 6,345,154 | B1 * | 2/2002 | Kubo | G02B 7/08 396/133 |
| 2012/0262595 | A1 * | 10/2012 | Kishida | G02B 7/08 348/220.1 |
| 2013/0010373 | A1 * | 1/2013 | Abe | G02B 7/102 359/698 |
| 2015/0304564 | A1 * | 10/2015 | Noguchi | H04N 5/23258 348/208.11 |
| 2016/0341941 | A1 * | 11/2016 | Shimotsu | G02B 7/005 |

FOREIGN PATENT DOCUMENTS

JP  04-014005  1/1992

* cited by examiner

*Primary Examiner* — Clayton E Laballe
*Assistant Examiner* — Linda B Smith
(74) *Attorney, Agent, or Firm* — John C. Pokotylo; Straub & Pokotylo

(57) ABSTRACT

An optical instrument comprising a plurality of focus drivers, including first and second focus drivers for respectively independently driving the first and second focus lenses within the plurality of focus lenses, and a second focus lens control position determination section for determining a control target position for every fixed period by referencing second focus position characteristic data that has been stored in the memory, based on control target position that has been determined by the first focus lens position determination section, wherein the plurality of focus drivers carryout driving of the first and second focus lenses based on control target positions for every fixed period that have been determined by the first and second focus lens control position determination sections.

4 Claims, 16 Drawing Sheets

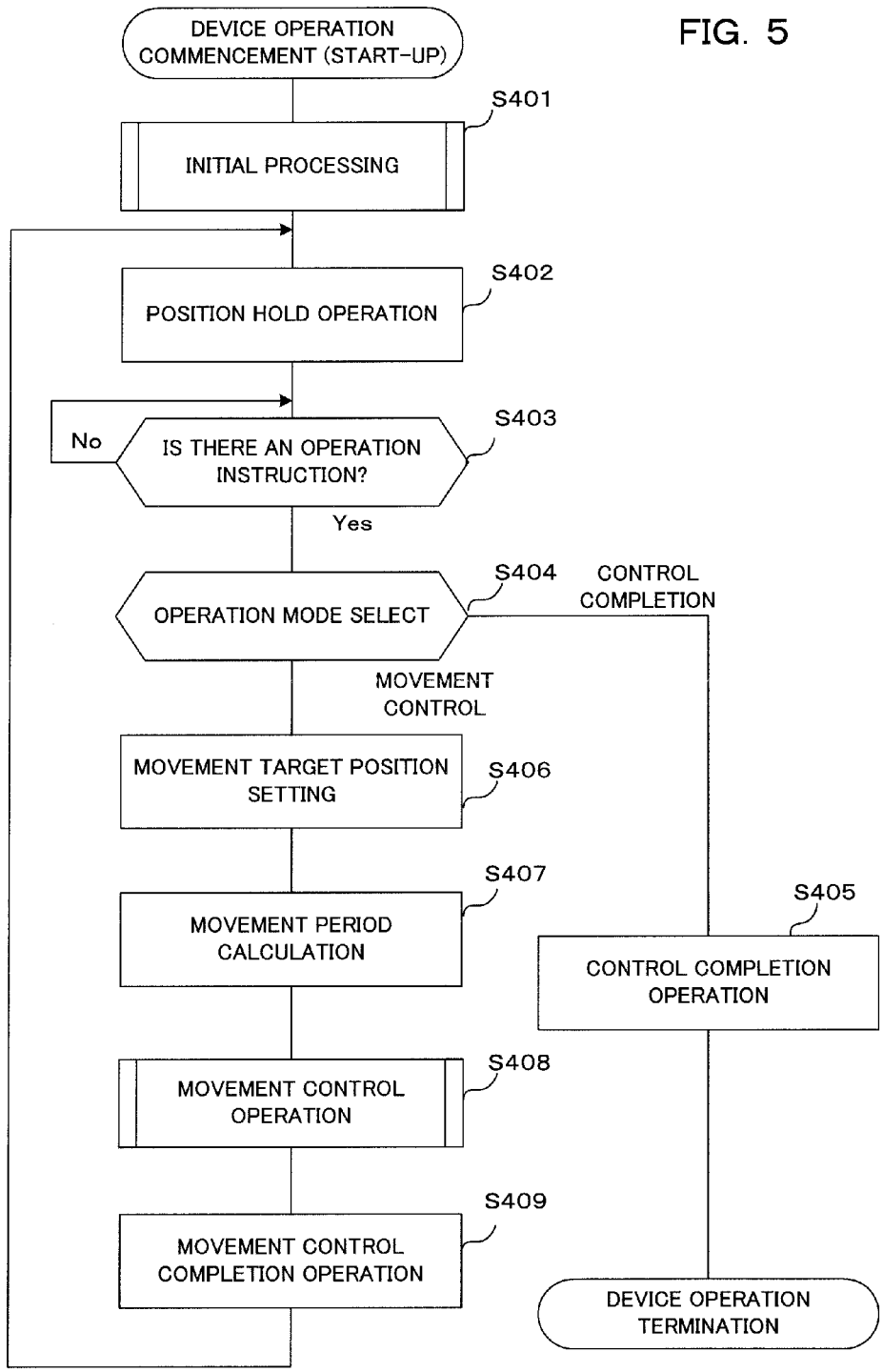

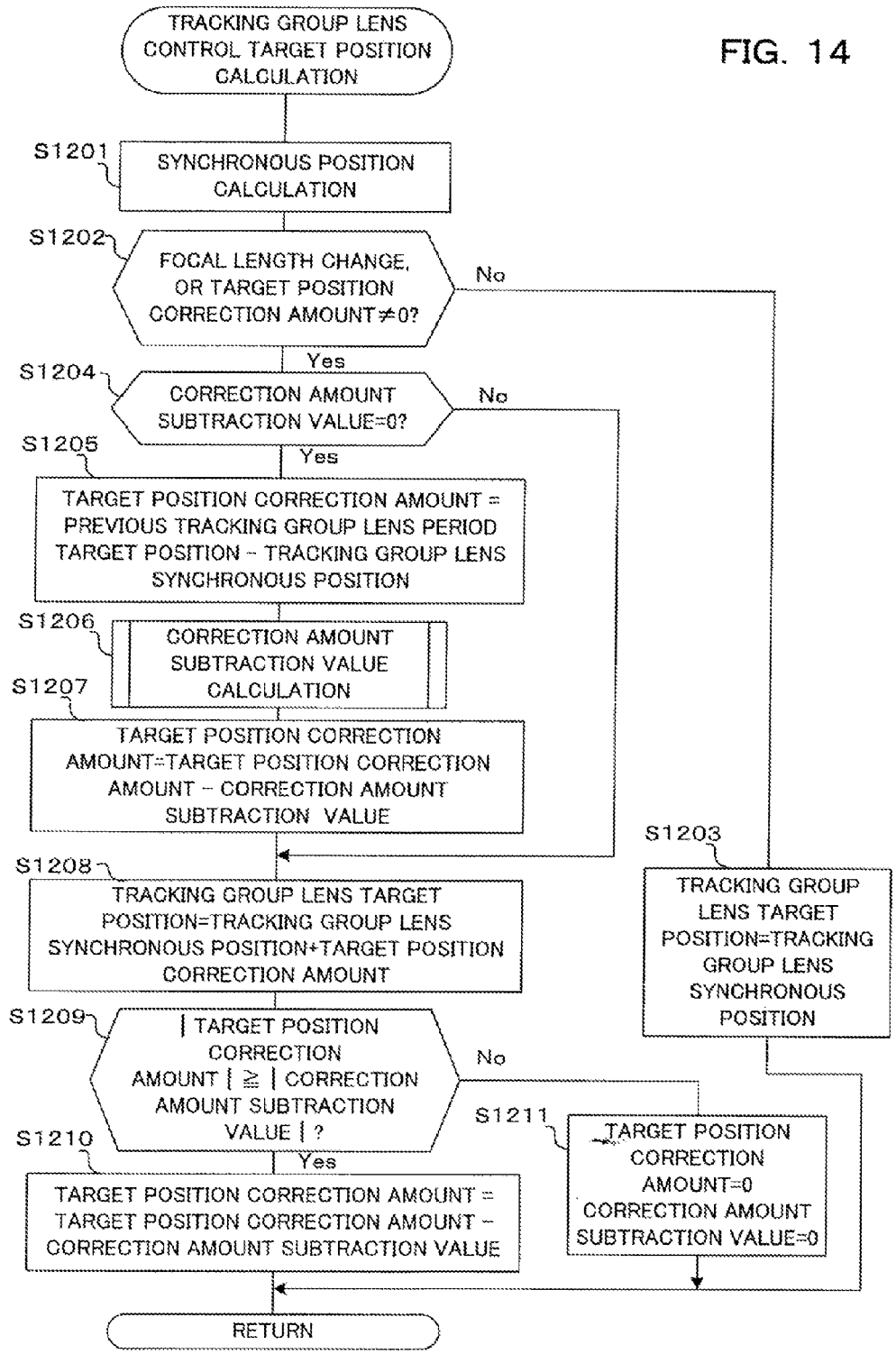

OPTICAL INSTRUMENT AND CONTROL METHOD FOR LENS

Benefit is claimed, under 35 U.S.C. §119, to the filing date of prior Japanese Patent Application No. 2014-239031 filed on Nov. 26, 2014. This application is expressly incorporated herein by reference. The scope of the present invention is not limited to any requirements of the specific embodiments described in the application.

BACKGROUND OF THE INVENTION

1. Field of the Invention

The present invention relates to an optical instrument having a plurality of focus lens groups, and a drive section capable of independent drive for each of the plurality of focus lens groups, and to a lens control method.

2. Description of the Related Art

An imaging device such as a digital still camera or digital video camera generally has an autofocus function. Using this autofocus function, positional control is carried out so that position of a focus lens within a shooting optical system becomes an in-focus position. Also, in order to suppress the occurrence of aberration at the time of focusing, a lens with which each of a plurality of focus lens groups move differently from each other at the time of focusing, a so-called floating system, is frequently used. Further, a lens barrel type provided with independent actuators for a plurality of focus lens groups is provided in Japanese Patent Laid-open No. Hei 4-14005 (hereafter referred to as prior art literature 1).

The focus system described in prior literature 1 comprises a magnifying zoom lens, and a plurality of focus lens groups made up of first and second focus lenses, and each focus lens is driven by an independent actuator. At the time of a shooting operation, this focus system carries out positional control of each focus lens group at fixed time intervals, and can focus on a desired subject. In this positional control, it is necessary to drive the first and second focus lenses by independently calculating target positions, and the amount of calculation for calculating target positions of each focus lens becomes significant. Also, with an increase in calculation amount, it is not possible to drive each focus lens group rapidly.

In the case of a variable focus lens such as that described in prior art literature 1, if focal length is changed by moving the zoom lens position, then positions at which the focus lens groups focus on the subject will change, even at the same subject instance. Further, in the case of having a floating focus configuration comprising a first focus lens and a second focus lens, cases may arise such that respective focal positions for a subject corresponding to focus length are not identical between the first focus lens and the second focus lens.

This means that when carrying out a magnification operation during shooting, there is a need for positional control to make in-focus position of the focus lens groups track in accordance with the magnification operation. This positional control is called a zoom tracking operation. To carry out zoom tracking, first, at fixed time intervals a focus lens group other than the first focus lens is instructed to move to a position that has been designated by the first focus lens and a position determined from focal length (first control). Then, if a magnification operation is performed, the position of the focus lens group other than the first focus lens becomes a different position to the position of the first focus lens after the magnification operation and the position determined from focal length.

If the above described magnification operation is carried out, a position where the focus lens group focuses on a subject is indeterminate. Accompanying this, a state arises where a taken image is out of focus in a period until position synchronism returns. Also, before and after a magnification operation a target position of a second focus lens is moved by rapid changes. This means that in a case where position of the second focus lens is subjected to tracking movement in conformity with movement of target position of the second focus lens accompanying a magnification operation, movement acceleration of the second focus lens changes rapidly. As a result, noise and vibration occur when the second focus lens is made to move, due to counteraction at the time of movement.

SUMMARY OF THE INVENTION

An object of the present invention is to provide an optical instrument that can drive focus lenses rapidly, even if the optical instrument has a plurality of focus lenses, and comprises a zoom lens and a plurality of focus lenses, capable of rapidly moving focus with suppressed noise and vibration, even in the case of a magnification operation where a zoom lens is moved, and to provide a lens control method.

An optical instrument of the present invention comprises a lens control method for an optical instrument, the optical instrument comprising a plurality of focus lens group including first and second focus lenses capable of moving in an optical axis direction, a plurality of focus drivers, including first and second focus drivers for respectively independently driving the first and second focus lenses within the plurality of focus lenses, a memory for storing first and second focus position characteristic data representing relationships between a specified subject distance and positions at which the plurality of focus lens groups reach a focused state, lens controller for controlling respective drive amounts for the first focus drive section and the second focus drive section, the lens controller comprising a first focus lens movement target position determination section for determining movement target position and movement period for the first focus lens, a first focus lens control position determination section for determining a control target position for every fixed period by referencing first focus position characteristic data that has been stored in the memory, based on the movement target position and movement period of the first focus lens, and a second focus lens control position determination section for determining a control target position for every fixed period by referencing second focus position characteristic data that has been stored in the memory, based on control target position that has been determined by the first focus lens position determination section, wherein the plurality of focus drivers carry out driving of the first and second focus lenses based on control target positions for every fixed period that have been determined by the first and second focus lens control position determination sections.

An optical instrument of the present invention, comprises a plurality of focus lens groups, including first and second focus lenses capable of moving in an optical axis direction, a magnification lens group that is capable of movement in the optical axis direction, for changing image magnification factor of a subject image by varying focal length by means of movement, a plurality of focus drivers, including first and second focus drivers for respectively independently driving the first and second focus lenses within the plurality of focus lenses, a zoom drive section for driving the magnification lens group, a zoom operation input section for supplying operation amount to the zoom drive section, a magnification lens position detector for detecting position of the magnification lens group in the optical axis direction, and a memory for storing first and second focus position characteristic data representing relationships between a specified subject distance and positions at which the plurality of focus lens groups reach a focused state, for every position of the magnification lens group, a first focus controller for respectively outputting first and second drive amounts for the focus drivers, based on first and second focus command positions determined based on first and second focus position characteristic data that has been stored in the memory for the magnification lens position detected by the magnification lens position detector, a second focus controller for respectively calculating first and second drive amounts with respect to the magnification lens position detected by the magnification lens position detector, based on first and second focus command positions determined based on first and second focus position characteristic data that has been stored in the memory for the magnification lens position detected by the magnification lens position detector, to obtain a second focus instruction position by different means than the first focus controller, and outputting a third drive amount to the plurality of focus drivers, and a lens controller being a selection section for selecting any one of the first and second focus lens controllers, wherein, when the lens controller is changing focal length of the magnification lens group in accordance with operation amount from the zoom operation input section, the selection section selects the second focus controller, while when the focal length of the magnification lens group is not being changed in accordance with operation amount from the zoom operation input section the selection section selects the first focus controller.

A lens control method for an optical instrument of the present invention, the optical instrument comprising a plurality of focus lens groups, including first and second focus lenses capable of moving in an optical axis direction, a magnification lens group that is capable of movement in the optical axis direction, for changing focal length of a subject image, a plurality of focus drivers, including first and second focus drivers for respectively independently driving the first and second focus lenses within the plurality of focus lenses, a zoom drive section for driving the magnification lens group, a zoom operation input section for supplying operation amount to the zoom drive section, a magnification lens position detector for detecting position of the magnification lens group in the optical axis direction, and a memory for storing first and second focus position characteristic data representing relationships between a specified subject distance and positions at which the plurality of focus lens groups reach a focused state, for every position of the magnification lens group, the lens control method comprising a first focus control step for respectively outputting first and second drive amounts for the focus drivers, based on first and second focus command positions determined based on first and second focus position characteristic data that has been stored in the memory for the magnification lens position detected by the magnification lens position detector, and a second focus control step for respectively calculating first and second drive amounts for the focus drivers, based on first and second focus command positions determined based on first and second focus position characteristic data that has been stored in the memory for the magnification lens position detected by the magnification lens position detector, to obtain a second focus command position by different means to the first focus control step, and outputting a third drive amount for the plurality of focus drivers, and wherein, when image magnification factor of the magnification lens group is being changed in accordance with operation amount from the zoom operation input section the second focus control step is executed, while when image magnification factor of the magnification lens group is not being changed in accordance with operation amount from the zoom operation input section the first focus control step is executed.

BRIEF DESCRIPTION OF THE DRAWINGS

FIG. 5 is a flowchart showing main operation of the camera system of the first embodiment of the present invention.

FIG. 14 is a flowchart showing operation of tracking group lens control target position calculation of the camera system of the second embodiment of the present invention.

DETAILED DESCRIPTION OF THE PREFERRED EMBODIMENTS

An example where a camera system is adopted as a preferred embodiment of the present invention will be described in the following. This camera system acquires an optical image of a subject, that has been formed using a lens barrel, by an imaging section as image data. The lens barrel has a drive section and a position controller, and controls position of a focus lens in an optical axis direction by respectively driving a plurality of focus lens groups to carry out focusing on a subject.

One example of a preferred embodiment of the present invention is represented by a positional control means for drivers for a lens barrel having a plurality of focus lens group applied to an imaging device. The lens barrel drivers and positional control means mentioned here are drivers for each focus lens group of a plurality of focus lens groups, and represent means for focusing on a subject of an imaging device by controlling position of the lens barrel of this focus lens in the optical axis direction. Also, the imaging device of the example shown here is applicable to a digital camera or the like (hereafter simply referred to as a camera) configured so as to acquire a subject image as optical image data that has been formed using an optical lens barrel (refer to FIG. 1 and FIG. 2).

Figure 1:
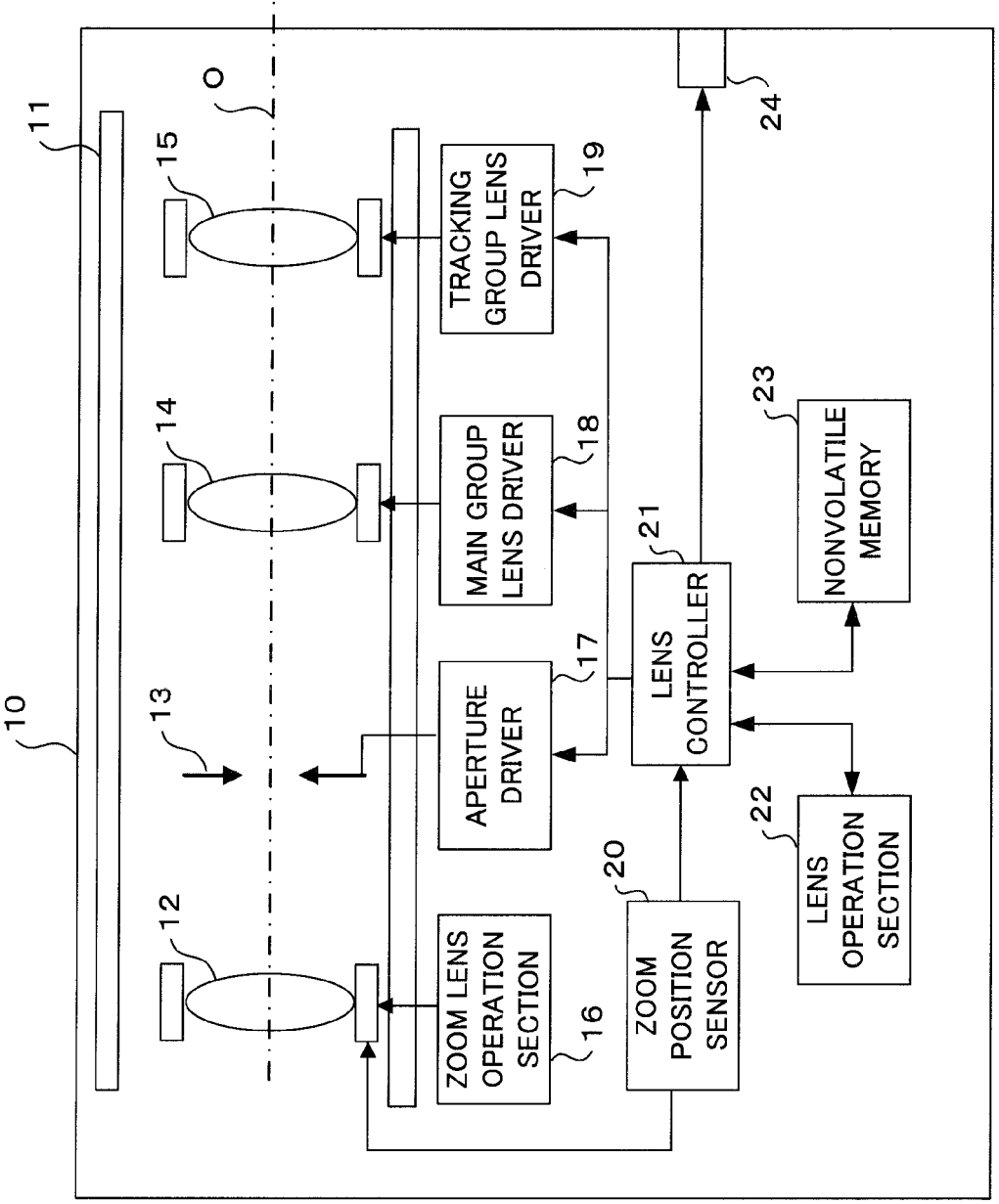
FIG. 1 is a block diagram mainly showing the electrical structure of a lens barrel section of a camera system of a first embodiment of the present invention.
Figure 2:
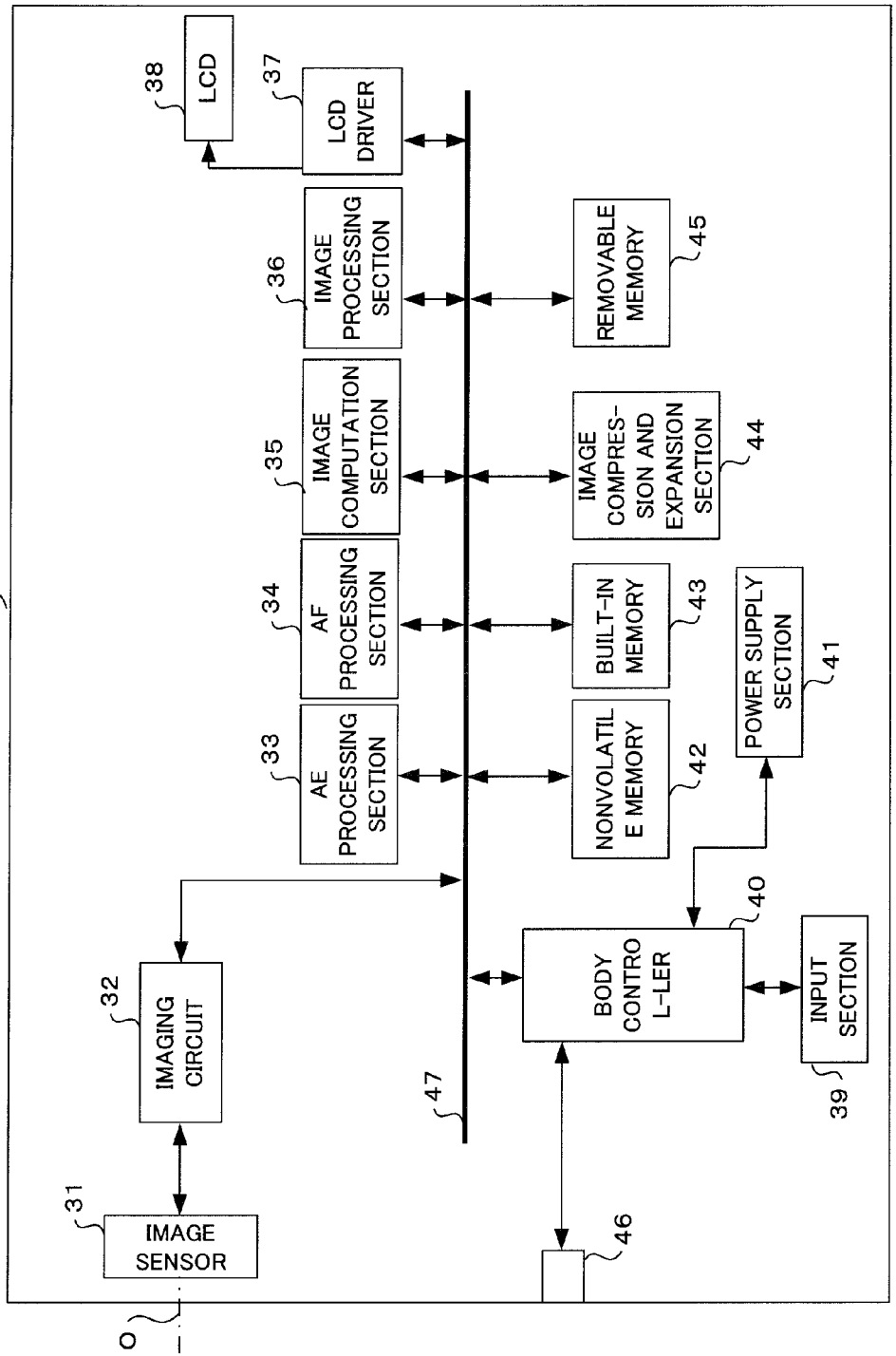
FIG. 2 is a block diagram mainly showing the electrical structure of a body section of a camera system of a first embodiment of the present invention.

FIG. 1 and FIG. 2 are block diagrams mainly showing the electrical structure of a camera system. This camera system comprises a camera body 30, and a lens barrel 10 that can be attached to or detached from the camera body 30. One example of this embodiment is a so-called interchangeable lens camera separately comprising a camera body 30 and a lens barrel 10. However, this embodiment is not limited to an interchangeable lens type camera, and may also be a camera in which the lens barrel is integral with the camera body.

Each section within the camera body 30 is shown in FIG. 2. The camera body 30 acquires image data from a subject image has been formed using the lens barrel 10, and carries out image processing, display and storage etc. The camera body 30 comprises an image sensor 31, imaging circuit 32, body controller 40 for unified control of the camera body 30, an LCD 38 for displaying a taken image, an input section 39 for inputting operation inputs to the camera body 30, a power supply section 41 for supplying power to each section of the camera body 30, and a body side interface (hereafter referred to as body side IF) 46 for transmitting and receiving control signals between the lens barrel 10 controller and the body controller 40.

The image sensor 31 is arranged on an extension line of the optical axis O of the optical system of the lens barrel 10. The image sensor 31 has a plurality of photoelectric conversion pixels, and receives a subject image (optical image) that has been formed by the lens barrel 10 at an imaging area, subjects this subject image to photo electric conversion using each of the photoelectric conversion pixels, generates an image signal, and outputs the image signal to the imaging circuit 32.

The imaging circuit 32 carries out control of the image sensor 31, and also performs signal processing such as amplification processing and A/D conversion etc. on the image signals from the image sensor 31. As control for the image sensor 31, the imaging circuit 32 carries out control of start and stop of photoelectric conversion, and read out of photoelectric conversion output that has been accumulated by each pixel as a result of the photoelectric conversion. This control is carried out in accordance with control signals from the body controller 40. Image signals that have been subjected to A/D conversion by the imaging circuit 32 are output to a bus 47.

The bus 47 is a signal transmission path for control signals etc. An AE (auto exposure) processing section 33, AF (autofocus) processing section 34, image computing section 35, image processing section 36, LCD (liquid crystal display) driver 37, nonvolatile memory 42, built-in memory 43, compression and expansion section 44, and removable memory 45, are connected to the bus 47.

The AE processing section 33 is input with image signals from the imaging circuit 32, calculates subject brightness, and outputs the calculated subject brightness. The AF processing section 34 is input with image signals, and outputs focus information of the image. For example, the AF processing section 34 calculates a contrast value or the like based on the image signals, and detects in-focus position from a peak value of this contrast value. Alternatively, for example, phase difference detection pixels may be arranged on the image sensor 31, and a defocus amount detected using a phase difference detection method.

The image computing section 35 carries out image computation processing, such as additive combination and pixel thinning, on the image signals. The image processing section 36 applies image processing such as tone correction and noise correction to the image signals. The LCD 38 is provided on the rear surface or the like of the camera body 30, and carries out live view display, playback display of stored images that have been stored in the removable memory 45, and display of menu screens etc. The display is not limited to an LCD, and another display such as an organic EL may be used, as well as an electronic viewfinder (EVF). The LCD driver 37 carries out display drive of the LCD 38.

The body controller 40 performs unified control of each section of the camera body 30 in accordance with programs for controlling the body 30 that have been stored in the nonvolatile memory 42.

The input section 39, power supply section 41, and a body side interface (hereafter referred to as body side IF) 46 are connected to the body controller 40. The input section 39 detects operating states of various operating members, such as a power switch, first release switch that is connected to a release button, second release switch, menu switch etc. and outputs the results of this detection to the body controller 40.

The power supply section 41 stabilizes a voltage of a power supply battery and supplies operating power to each section within the camera body 30 and the lens barrel 10. The body side IF 46 is electrically connected to a lens side interface (hereafter referred to as lens side IF) 24 at the lens barrel 10 side, and carries out transmission and reception of signals between the body controller 40 and the lens controller 21 at the lens barrel 10 side.

The nonvolatile memory 42 is an electrically rewritable nonvolatile memory, and stores program code for causing operation by the body controller 40, and adjustment data etc. The built-in memory 43 is a volatile memory such as SDRAM, and temporarily holds image data that will be processed by the image computing section 35 and the image processing section 36. The expansion section 44 carries out compression processing and expansion processing on the image data. The removable memory 45 is a storage medium capable of being inserted into and removed from the camera body 30, and stores image data of taken images.

Next, the structure of the lens barrel 10 will be described using FIG. 1. The lens barrel 10 has a zoom lens 12, aperture 13, first focus lens group (also called main group lens) 14, and a second focus lens group (also called tracking group lens) 15 arranged along an optical axis O of the optical system, and also has a fixed member 11 holding these optical components.

The zoom lens 12 is capable of movement in an optical axis direction of the optical system within the lens barrel 10, and changes focal length (image magnification factor) by moving in the optical axis direction. A zoom lens operation section 16 has an operation member such as a zoom ring that can be operated by the user and a drive mechanism mechanically coupled to the zoom lens 12 by the operation member, and driving the zoom lens 12. If the operation member of the zoom lens operation section 16 is subjected to a rotation operation, the zoom lens 12 moves in the optical axis direction and the focal length (image magnification factor) is changed. With this embodiment, the zoom lens operation section 16 changes the focal length as a result of a manual operation by the user, but this is not limiting, and the zoom lens 12 may also be moved in the optical axis direction using drive power such as a drive motor etc.

A zoom position sensor 20 detects position of the zoom lens 12 in the optical axis direction (focal length information), and outputs a result of detection to the lens controller 21.

The zoom lens 12 is capable of movement in the optical axis direction, and functions as a magnification lens group for changing magnification factor of a subject image by changing the focal length. The zoom lens operation section 16 functions as a zoom drive section for driving the magnification lens group, and also functions as a zoom operation input section force supplying operation amount to the zoom drive section. The zoom position sensor 20 functions as a magnification lens position detector for detecting position of the magnification lens group in the optical axis direction.

The aperture 13 is arranged within the optical system and opening amount is adjusted. The aperture driver 17 adjusts opening amount of the aperture 13 based on drive signals from the lens controller 21.

The main group lens 14 and the tracking group lens 15 are capable of moving in the optical axis direction of the optical system independently of each other. The main group lens 14 is driven in the optical axis direction by a main group lens driver 18, and the tracking group lens 15 is driven in the optical axis direction by a tracking group lens driver 19. The two drivers 18 and 19 respectively independently carry out drive control of the two lenses 14 and 15 based on drive control signals from the lens controller 21. The two lenses 14 and 15 are placed in a state of being focused at a specified distance by being arranged at positions in accordance with a positional relationship between the two that is stored in the nonvolatile memory 23, which will be described later.

With this embodiment, the main group lens driver 18 and the tracking group lens driver 19 have stepping motors, and the stepping motors are driven by applying stepping pulses to the stepping motors based on drive control signals from the lens controller 21. In this case, since a number of stepping pulses is proportional to movement amount of the main group lens 14 and the tracking group lens 15, with this embodiment sensors for detecting positions of the two lenses 14 and 15 are not provided. In the case of using DC motors or VCMs (Voice Coil Motor) instead of the stepping motors, sensors for respectively detecting positions of the two lenses 14 and 15 are provided, and lens control for the focus lens may be carried out so that positions detected by the sensors track positions constituting control targets.

The main group lens 14 and the tracking group lens 15 fulfill a function of adjusting focus state of a plurality of focus lens group including first and second focus lenses that are capable of moving in the optical axis direction. The main group lens driver 18 and the tracking group lens driver 19 function as a plurality of focus drivers, including first and second focus drivers, for respectively independently driving the first and second focus lenses within the plurality of focus lenses along the optical axis direction. As will be described later, this plurality of focus drivers carries out drive of the first and second focus lenses based on control target positions every fixed period that have been determined by the first and second focus lens control position determination sections (refer to the main group lens control target position determination section 206 and the tracking group lens control target position determination section 208, which will be described later).

The lens controller 21 includes a CPU (Central Processing Unit) and peripheral circuits for the CPU, and performs unified control of each section of the lens barrel 10 in accordance with programs for lens control that have been stored in the nonvolatile memory 23. Details of the lens controller 21 and its peripherals will be described later in association with drive control of the main group lens 14 and the tracking group lens 15, using FIG. 3.

A lens operation section 22 that is connected to the lens controller 21 has a manual operation member for focusing, such as a range ring, and a detector which detects rotation direction and rotation amount of this operation member, and the lens operation section 22 outputs a detection signal from the detector to the lens controller 21. The lens controller 21, in the event that manual focus mode has been set, carries out drive control for both of the drivers 18 and 19 in accordance with detected operation amount of the manual operation member, and carries out position control of the two lenses 14 and 15, to perform focusing.

The nonvolatile memory 23 is an electrically rewritable nonvolatile memory. Besides the program code for lens control for the lens controller 21 described previously, adjustment values for positions of the zoom lens 12, aperture 13, main group lens 14 and tracking group lens 15 etc., and data for obtaining target position of the tracking group lens from the focal length and the target position of the main group lens, are stored in the nonvolatile memory 23. The nonvolatile memory 23 functions as a memory for storing first and second focus position characteristic data representing relationships between a specified subject distance and positions at which the plurality of focus lens groups reach a focused state, for every position of the magnification lens group.

The lens side IF 24 is connected to the body side IF 46 at the camera body 10 side, and carries out transmission and reception of signals between the lens controller 21 and the body controller 40.

Next, the lens controller 21 and its peripheral sections will be described using FIG. 3. A lens control communication interface (hereafter referred to as lens control communication IF) 201 is input with control signals from the body controller 40 via the lens IF 24. Various control signals, such as lens drive control signals when autofocus mode is set, are input from the body controller 40, and output to the main group lens movement target position and movement (period) determination section 204.

An operation input interface (hereafter referred to as operation input IF) 202 is input with lens control signals (for example, manual operation signals at the time of manual focus mode) from the lens operation section 22, and outputs to the main group lens movement target position and movement determination section 204.

A memory communication interface (hereafter referred to as memory communication IF) 203 transmits and receives data to and from the nonvolatile memory 23, and outputs data to the main group lens control target position determination section 206 and the tracking group lens control target position determination section 208.

A zoom position detector 205 calculates focal length that is determined by position of the zoom lens 12 in the optical axis direction, from control signals of the zoom position sensor 20. This calculated zoom position is output to the main group lens movement target position and movement determination section 204, the main group lens control target position determination section 206, and the tracking group lens control target position determination section 208.

When focus adjustment using the focus lens has been instructed by means of the lens control communication IF 201 or the operation input IF 202, the main group lens movement target position and movement determination section 204 determines movement target position of the main group lens 14 in accordance with this instruction. With this embodiment, once movement target position has been determined, time (period) until the target position is reached is obtained, and a number of times that processing is performed until that movement target position is reached is determined.

With this embodiment, since drive processing for the focus lens is executed every fixed period, the number of times the processing is performed is determined taking into consideration movement amount of the focus lens in a fixed period. The main group lens movement target position and movement determination section 204 functions as a first focus lens movement target position determination section for determining movement target position and movement period of the first focus lens.

The main group lens control target position determination section 206 is input with movement target position that has been determined by the main group lens movement target position and movement determination section 204, and the number of times processing is performed, and determines movement destination for a every fixed period, namely, control target position. The main group lens control target position determination section 206 functions as a first focus lens group control position determination section for determining a control target position for every fixed period by referencing first focus position characteristic data that has been stored in the memory, based on the movement target position and movement period of the first focus lens.

A main group lens operation amount determination section 207 determines operation amount of the main group lens so that the main group lens 14 will reach the control target position that was determined by the main group lens control target position determination section 206. In the case where the main group lens driver 18 is a stepping motor, the main group lens operation amount determination section 207 determines a number of steps to be applied to the stepping motor as an operation amount of the main group lens 14. Operation amount that has been determined by the main group lens operation amount determination section 207 is output to the main group lens driver 18, and the main group lens 14 is moved in the optical axis direction.

The tracking group lens control target position determination section 208 determines tracking group lens control target position from the main group lens control target position that has been determined by the main group lens control target position determination section 206 and focal length that has been detected by the zoom position detector 205. Determination of the tracking group lens control target position by the tracking group lens control target position determination section 208 is carried out using characteristic data stored in the nonvolatile memory 23. With this embodiment, the tracking group lens control target position determination section 208 does not independently determine position of the tracking group lens 15 and position of the main group lens 14, but carries out determination based on control target position of the main group lens 14. As a result, it is not necessary to determine movement target position of the tracking group lens 15, and it is possible to reduce the amount of computation needed for determination.

The detailed structure of the tracking group lens control target position determination section 208 will be described later using FIG. 4 and FIG. 12. The tracking group lens control target position determination section 208 functions as a second focus lens control position determination section for determining a control target position for every fixed period by referencing second focus position characteristic data that has been stored in the memory, based on control target position that has been determined by the first focus lens position determination section.

A tracking group lens operation amount determination section 209 determines operation amount of the tracking group lens so that the tracking group lens 15 will reach the control target position that was determined by the tracking group lens control target position determination section 208. In the case where the tracking group lens driver 19 is a stepping motor, a number of steps to be applied to the stepping motor is determined as an operation amount. Operation amount that has been determined by the tracking group lens operation amount determination section 209 is output to the tracking group lens driver 19, and the tracking group lens 15 is moved in the optical axis direction.

Next, operation of this embodiment will be described using the flowcharts shown in FIG. 5 to FIG. 8. Drive control of the focus lenses (main group lens 14 and tracking group lens 15) of this embodiment is called a first control method. This flowchart is executed by the CPU within the lens controller 21 controlling each section within the lens barrel 10 in accordance with a program stored in the nonvolatile memory 23. In order to simplify understanding, the first control method will be described for a case where, with no operation of the zoom lens operation section 16, a change instruction for focal length is performed by operation of the lens operation section 22 or with a drive instruction from the camera body 30 via the lens side IF 24.

In the flowchart shown in FIG. 5, if the camera body 30 is started up, a lens barrel 10 is also started up, and initial processing is carried out (S401). In this step the initial processing such as reading out of data from the nonvolatile memory 23 is carried out. Details of this initial processing section 105 will be described later using FIG. 6.

Once initial processing is been carried out, next a position holding operation is carried out (S402). Here, electric current is passed to actuators such as stepping motors within the main group lens driver 18 and the tracking group lens driver 19, to hold the current position of the main group lens 14 and the tracking group lens 15.

Once the position maintaining operation has been carried out in step S402, it is determined whether or not there is an operation instruction (S403). Here it is determined whether or not there is an operation instruction such as an operation instruction based on operation of the zoom lens operation section 16, an operation instruction based on operation of the lens operation section 22, or an operation instruction from the body controller 40 via the lens side IF 24. If the result of this determination is that there is not an operation instruction, a wait state awaiting an operation instruction is entered.

If the result of determination in step S403 was that there was an operation instruction, operation mode selection is carried out. Here, as operation mode selection, it is determined whether a movement control operation will be carried out, or if control will be terminated, based on the content of the instruction in step S403.

If the result of determination in step S404 was that operation mode was movement control, setting of movement target position is carried out (S406). Here, the main group lens movement target position and movement determination section 204 carries out setting of movement target position for the main group lens 14 and the tracking group lens 15 based on the operation instruction that was input in step S403. For example, in a case where the main group lens 14 and the tracking group lens 15 are respectively moved to movement target positions corresponding to focal length that is instructed by the user, based on operation of the zoom lens operation section 16, the movement target positions are set in accordance with the instructed focal length.

If movement target positions have been set in step S406, next calculation of a number of times periodic processing will be required for movement control is calculated (S407). Here, the main group lens movement target position and movement determination section 204 calculates a number of times of position setting (periodic processing) instructed every fixed time period required to move to the movement target position that was set in step S406. A number of times of periodic processing required for movement to the movement target position is determined using a predetermined calculation method. Calculation of this number of times of periodic processing is determined taking into consideration drive characteristics of the main group lens driver 18 and the tracking group lens driver 19 (for example, maximum movement speed and maximum movement acceleration).

If calculation of a number of times that periodic processing will be required for movement control has been carried out in step S407, next a movement control operation is carried out (S408). Here, every fixed period, the main group lens 14 and the tracking group lens 15 are driven towards the control target positions, and this is repeated for the number of times of periodic processing that was calculated in step S407, to thus move the main group and tracking group lenses to the movement target positions. Details of this movement control operation will be described later using FIG. 7, and FIG. 9A and FIG. 9B.

If the movement control operation of step S408 has been carried out, a movement control completion operation is carried out (S409). Here, since the movement target positions have been reached, processing is carried out in order to terminate the movement control operations for the main group lens 14 and the tracking group lens 15, and once this processing is complete processing returns to step S402.

If the result of determination in step S404 was that operation mode was control completion, a control completion operation is carried out (S405). Once the control completion operation has been carried out, operation is terminated.

Figure 6:
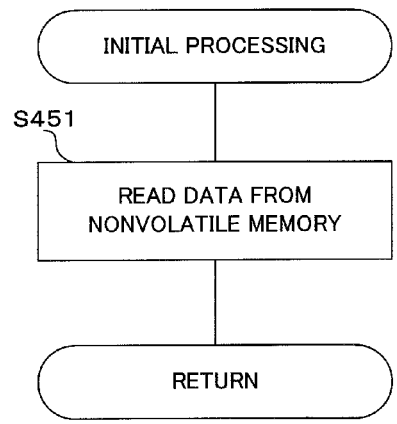
FIG. 6 is a flowchart showing operation of initial processing of the camera system of the first embodiment of the present invention.

Next the initial processing of step S401 will be described using FIG. 6. If the flow for initial processing shown in FIG. 6 is entered, data is readout from the nonvolatile memory 23 (S451). Data for obtaining target position of the tracking group lens 15 from target position of the main group lens 14 corresponding to a specified subject distance, for focal length, are stored in the nonvolatile memory 23 as characteristic data. In this step, this data is read out from the lens controller 21.

Once readout of data has been carried out in step S451, the originating processing flow is returned to.

Figure 9A:
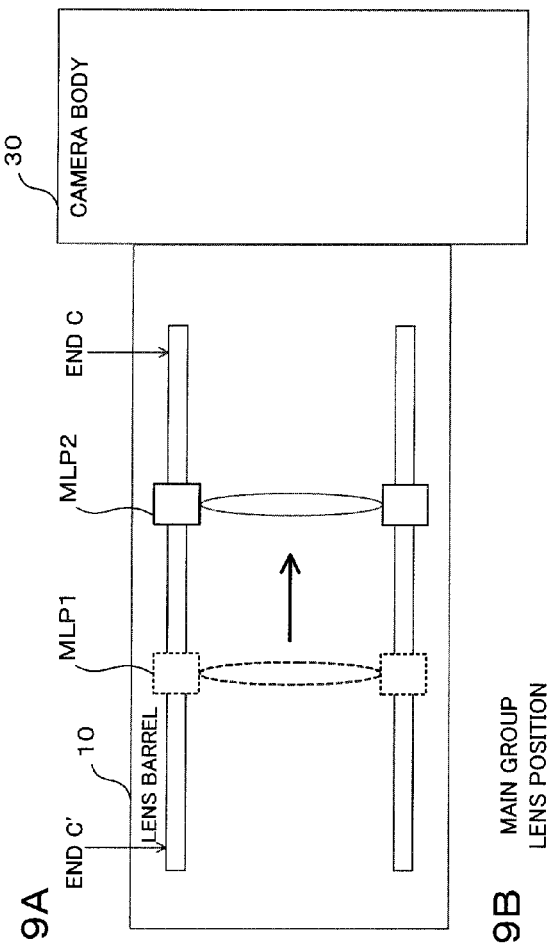
FIG. 9A and FIG. 9B are drawings for describing means of movement control in the camera system of the first embodiment of the present invention, with FIG. 9A being a internal cross sectional drawing of the inside of a lens barrel for describing movement of focus lenses, and FIG. 9B being a graph showing movement of the focus lenses.

Next, the movement control operation of step S408 (refer to FIG. 5) will be described using FIG. 9A, FIG. 9B and FIG. 10. The lenses are moved to the instructed movement target position by this movement control operation. Specifically, as shown in FIG. 9A, this is an operation to move the main group lens 14 which is at an initial position MLP1 to a movement target position MLP2. At the time of movement of the main group lens 14, the lens is not moved suddenly to the movement target position MLP2, but as shown in FIG. 9B, the main group lens 14 is moved every fixed period (times t1, t2, . . . ) to positions P(t1), P(t2), . . . , until at time tN the main group lens 14 is moved to the movement target position MLP2.

Figure 9B:
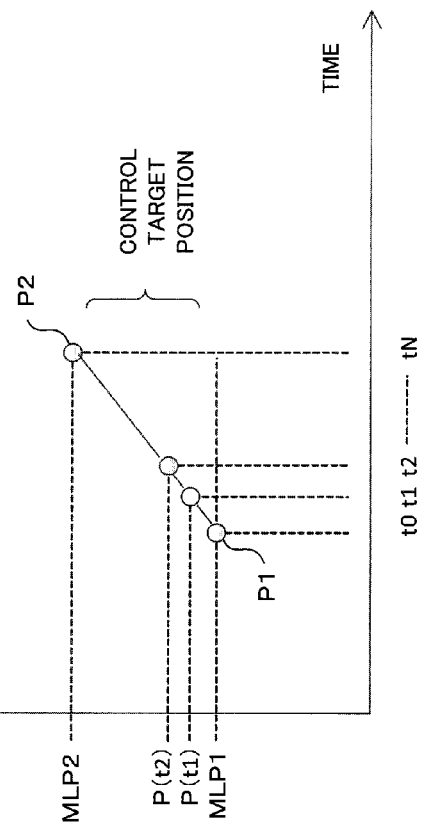

In FIG. 9A and FIG. 9B, only the main group lens 14 is shown for the sake of explanation, and the tracking group lens 15 has been omitted. If the main group lens 14 and the tracking group lens 15 are at the same focal length, then the respective positions of the main group lens 14 and the tracking group lens 15 are in a one-to-one relationship, as shown in FIG. 10. FIG. 10 shows positions of respective lens groups on the vertical axis, and shows subject distance on the horizontal axis. Also regarding main group and tracking group lens positions on the vertical axis, a higher position is toward the camera body 30 side while a lower position is toward the subject image side, and for subject distance shown on the horizontal axis, the direction towards the right is a direction in which subject distance become shorter (close-up), while the direction towards the left is the direction in which subject distance becomes longer (infinity end). For example, when a subject distance is FCm, the subject is in focus when the main group lens 14 is at position MLP1 and also the tracking group lens 15 is at position SLP1. Also, when a subject distance is FCn, the subject is in focus when the main group lens 14 is at position MLP2 and also the tracking group lens 15 is at position SLP2. For subject distances between the two subject distances FCm and FCn, positions of the main group lens 14 and the tracking group lens 15 where the subject is in focus respectively have a one-to-one relationship.

Figure 10:
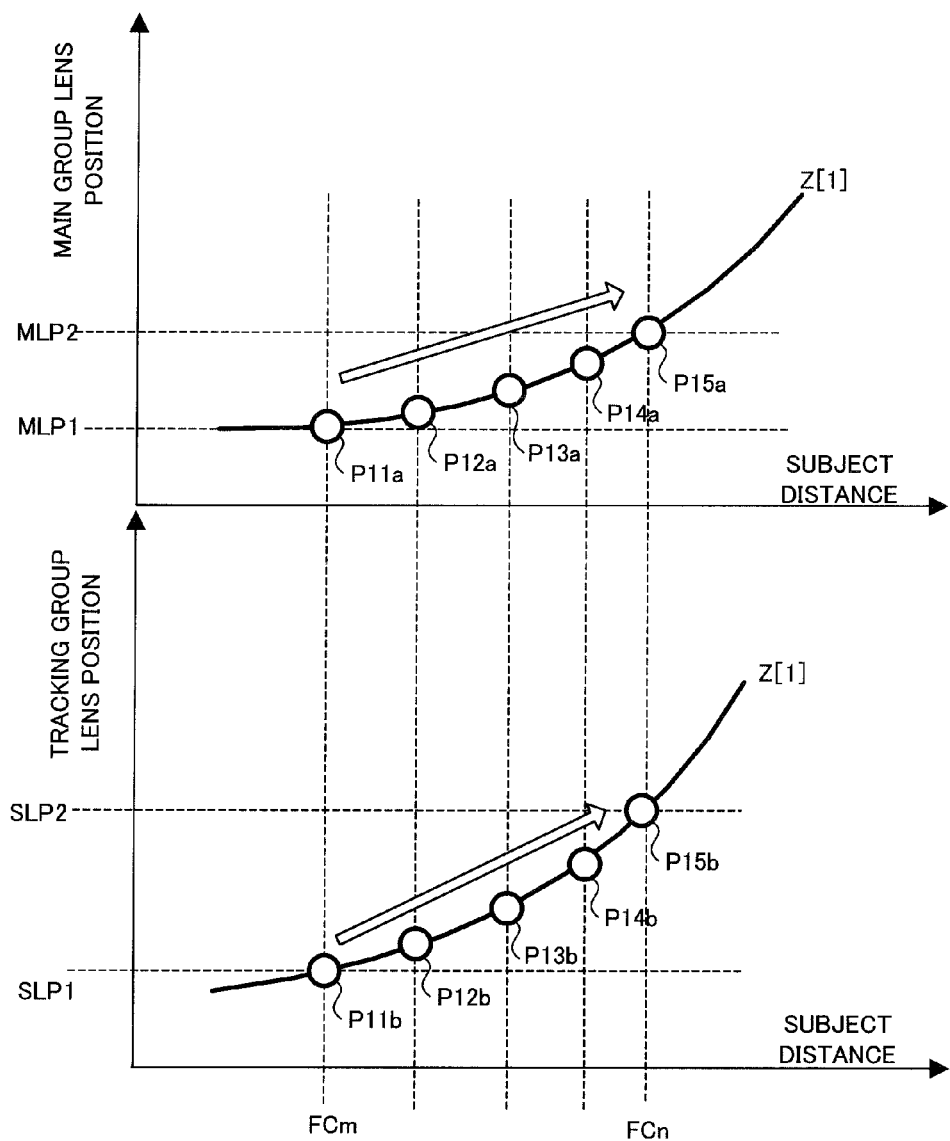
FIG. 10 is a graph showing a positional relationship between main group lenses and tracking group lenses, when carrying out movement control of the focus lens group, in a case where focal length is not changed, in the camera system of a first embodiment of the present invention.

In FIG. 10, when control target position of the main group lens 14 at a focal length of Z[1] is MLP1, control target position of the tracking group lens 15 corresponds to SLP1. In a case where MLP2 has been instructed as the movement target position of the main group lens, the main group lens control target position determination section 206 determines control target position at each time (periodic processing) until the main group lens 14 is moved to the movement target position MLP2. In the case of focal length [Z]1, control target positions of the tracking group lens 15 at each time until being moved to the movement target position SLP2 corresponding to the movement target position MLP2 of the main group lens 14 are determined by the control target position of the main group lens and the focal length Z[1]. Accordingly, if the subject distance and focal length are determined, positions of the main group lens 14 and the tracking group lens 15 are determined, and control target positions during movement control also determined.

With the first control method of this embodiment, therefore, position of the main group lens 14 is determined in accordance with a movement target position that has been instructed, and position of the tracking group lens 15 is determined using characteristic data that has been stored in the nonvolatile memory 23. In this case, as shown in FIG. 9B, control target positions of the main group lens 14 are determined every fixed period of time (t0, t1, t1, . . . ), control positions of the tracking group lens 15 corresponding to these control target positions are determined, and the main group and tracking group lenses are moved to respective control target positions.

Next, the movement control operation of the first control method of step S408 (refer to FIG. 5) will be described using FIG. 7. If the flow for the movement control operation is entered, first a main group lens control target position is calculated (S501). Here, the main group lens movement target position and movement determination section 204 calculates positions (control target positions) instructed for every fixed period (P(tn) (n=1, 2, 3, . . . , N) shown in FIG. 9B) in order to move to an instructed movement target position (position MLP2 in FIG. 9), from the current lens position (position MLP1 in FIG. 9B) of the main group lens 14 in the optical axis direction.

If main group lens control target positions have been calculated in step S501, the tracking group lens control target positions are calculated (S502). Here, control target positions of the tracking group lens 15 are calculated using the main group lens control target positions that were calculated in step S501, and characteristic data that has been read out from the nonvolatile memory 23. As was described using FIG. 10, if the control target positions of the main group lens 14 are determined, it is possible to obtain positions of the tracking group lens 15. Detailed operation of this tracking group lens control target position calculation will be described later using FIG. 8.

Once the tracking group lens control target positions have been calculated in step S502, next calculation of main group lens operation amount is carried out (S503). Here, the main group lens operation amount determination section 207 calculates operation amount required for movement to the main group lens control target position that was calculated by the main group lens control target position determination section 206 (calculated in step S501), from the current position of the main group lens 14. If the main group lens driver 18 has a stepping motor, number of steps is calculated as this operation amount.

Once the main group lens operation amount has been calculated in step S503, next calculation of tracking group lens operation amount is carried out (S504). Here, the tracking group lens operation amount determination section 209 calculates operation amount required for movement to the tracking group lens control target position that was calculated by the tracking group lens control target position determination section 208 (calculated in step S502), from the current position of the tracking group lens 15. If the tracking group lens driver 19 has a stepping motor, number of steps is calculated as this operation amount.

Once the tracking group lens operation amount has been calculated in step S504, next operation amount is set in the main group lens driver (S505). Here, the main group lens operation amount that was calculated by the main group lens operation amount determination section 207 (calculated in step S503) is set in the main group lens driver 18.

Once the operation amount has been set in the main group lens driver in step S505, next operation amount is set in the tracking group lens driver (S506). Here, the tracking group lens operation amount that was calculated by the tracking group lens operation amount determination section 209 (calculated in step S504) is set in the tracking group lens driver 19

If operation amount has been set in the tracking group lens in step S506, it is next determined whether or not the main group lens movement target position has been reached (S507). Here, it is determined whether or not the main group lens control target position that was calculated by the main group lens control target position determination section 206 coincides with the main group lens movement target position.

If the result of determination in step S507 is that the movement target position has been reached, the movement control operation is completed. On the other hand, if the movement target position has not been reached step S501 is returned to, and the previously described processing is repeated.

Next, the tracking group lens control target position calculation of step S502 will be described using FIG. 8. If the flow for tracking group lens control target position calculation is entered, synchronous position is calculated (S701). Here, control target position of the tracking group lens 15 is calculated using the control target position of the main group lens 14 that was calculated by the main group lens control target position calculation section 206, the focal length setting value that was detected by the zoom position detector 205, and characteristic data that has been read out from the nonvolatile memory 23 (refer to FIG. 4). The characteristic data is read out from the nonvolatile memory 23 at the time of start-up (refer to S401 in FIGS. 5 and S451 in FIG. 6). When then referencing the characteristic data for determining control target position, position corresponding to the current focal length (synchronous position) may be searched.

If synchronous position has been calculated in step S701, the flow for tracking group lens control target position is completed, and the originating flow is returned to.

In this way, with the first embodiment of the present invention, if movement target position and movement period of the main group lens 14 are determined, control target position of the main group lens 14 is determined every fixed period based on this movement target position and movement period, control target position of the tracking group lens 15 is determined using this determined control target position of the main group lens 14, and drive control is respectively carried out for the main group lens 14 and the tracking group lens 15. As a result, computation amount for driving the plurality of focus lens groups is reduced, and rapid drive control becomes possible.

Next, a second embodiment of the present invention will be described using FIG. 11 to FIG. 16. With the first embodiment, a positional relationship between the main group lens 14 and the tracking group lens 15, each being one of a plurality of focus lens groups, was a one-to-one relationship, and so if control target position (synchronous position) of the main group lens 14 is determined control target position of the tracking group lens 15 corresponding to that position is calculated (refer to S502 in FIGS. 7 and S701 in FIG. 8), and drive control for the tracking group lens 15 was carried out based on this control target position (first control method).

However, with the first control method, in the event that a magnification operation (zooming) is carried out, the tracking group lens 15 is driven with abrupt acceleration due to change in the control target position of the tracking group lens 15 accompanying change in the focal length, and as a result there is a danger of noise and vibration occurring. The reasons for this will be described in the following using FIG. 11.

Next, operation of the main group lens 14 and the tracking group lens 15 in a case where the first control method is carried out when changing from focal length Z [1] to focal length Z [2] will be described using FIG. 11.

Figure 11:
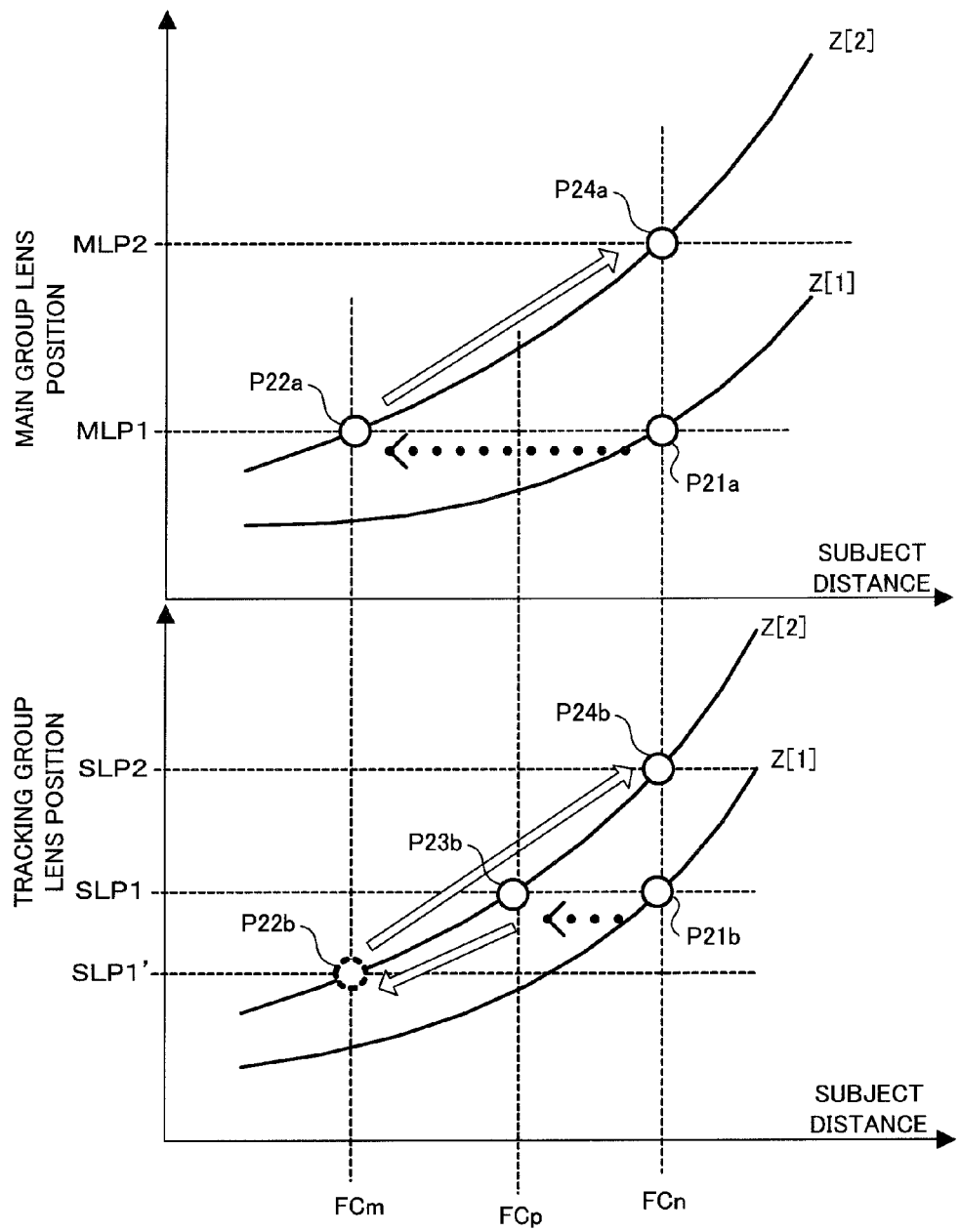
FIG. 11 is a graph showing a positional relationship between main group lenses and tracking group lenses for focus lens control carried out when focal length has been changed, in the camera system of a first embodiment of the present invention.

In FIG. 11, a position hold operation of the main group lens 14 at MLP1 (position P21a) is carried out for focal length Z[1]. At this time, the tracking group lens 15 is subjected to a position hold operation at SLP1 (position P21b). A case where, from this state, the focal length is changed from Z[1] to Z[2] will be considered. In this case, the zoom position detector 205 detects that focal length has changed to Z[2]. If focal length is made Z[2] with the position of the main group lens 14 being MLP1, the corresponding position of the tracking group lens 15 becomes SLP1' (position P23b).

Also, if subject distance that is focused on in the case where the main group lens 14 and the tracking group lens 15 become specified positions (MLP1 and SLP1) is considered, a subject distance that is focused on at the time of focal length Z[1] is FCn. However, immediately after having changed to focal length Z[2] with the main group lens 14 and the tracking group lens 15 at respective positions MLP1 and SLP1, a subject distance that is focused on becomes FCm. Accordingly, the main group lens 14 and the tracking group lens 15 are not at the positions (positions P24a and P24b) where subject distance FCn is reached with focal length Z[2]. In a case where focal length has been changed by a zoom operation also, since losing focus is not desired, in a case where focal length has been detected control (zoom tracking control) is carried out to drive the focus lens groups so as to become the same focal length as before focal length change.

In this case movement processing is carried out to move the main group lens 14 from MLP1 to the target position MLP2 (position P24a). Movement of the tracking group lens 15 in this case will be considered. As a result of zoom tracking control, when moving the main group lens from MLP1 to MLP2, the tracking group lens 15 is moved from SLP1' (position P22b) to the control target position SLP2 (position P24b) which is a position corresponding to control target position of the main group lens 14 and focal length Z[2]. However, since the initial position of the tracking group lens 15 is SLP1 (position P23b), in the case of subjecting the tracking group lens 15 to movement control in accordance with the first control method of the first embodiment the target position of periodic processing when commencing movement processing becomes SLP1'. As a result, when the focal length due to a zoom operation is changed from focal length Z[1] to Z[2], movement of the tracking group lens 15 from SLP1→SLP1' (P23b→P22b) occurs. In this case, abrupt acceleration change arises due to movement over distances SLP1 and SLP1', and this affects the shooting conditions, and also causes noise and vibration.

With this embodiment, therefore, when carrying out a magnification operation (zoom operation) or the like, a second control method is adopted, so that abrupt acceleration change does not occur. The second control method will be described using FIG. 12 to FIG. 16.

Figure 3:
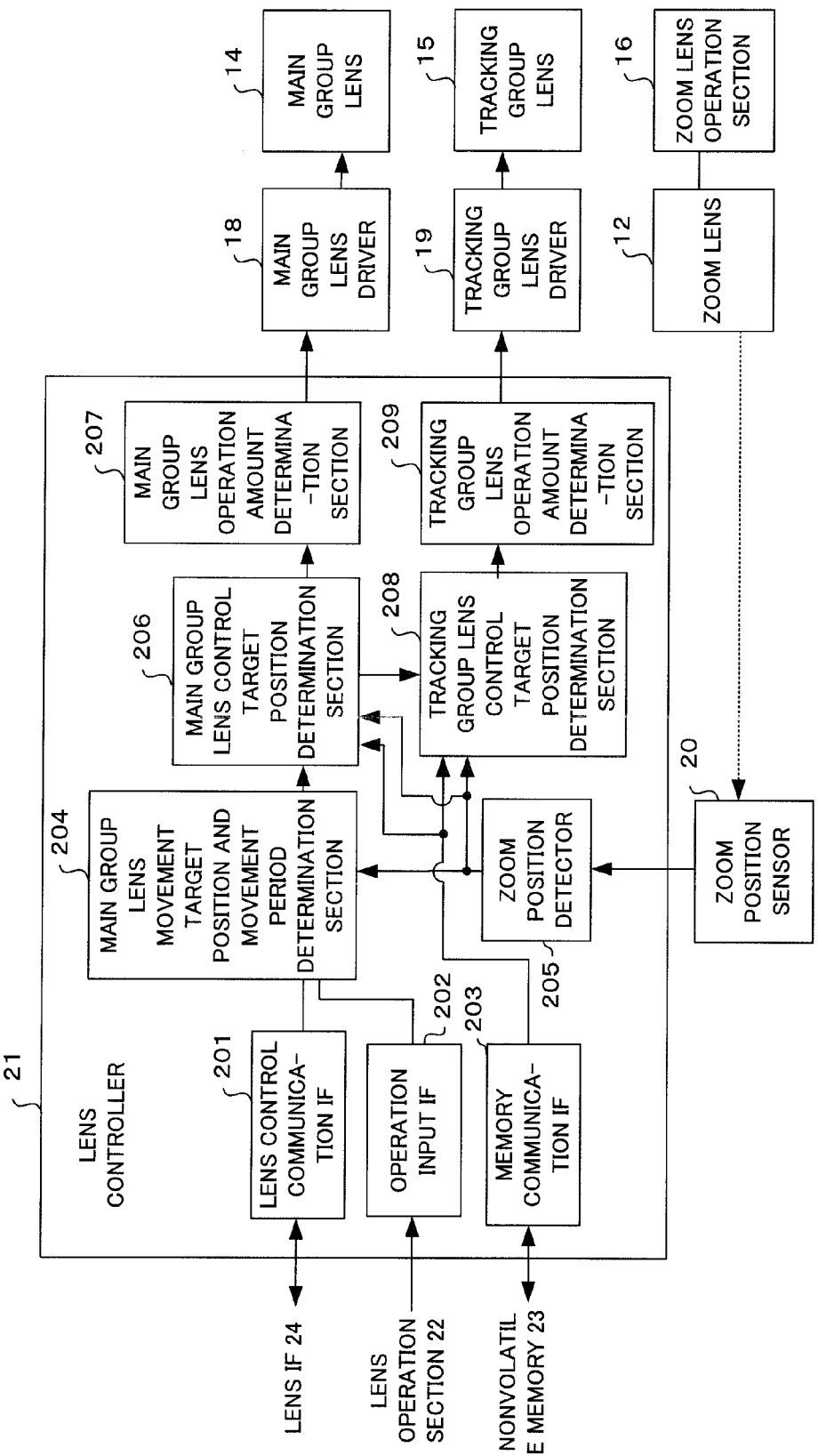
FIG. 3 is a block diagram showing the detailed electrical structure of a lens controller, and its peripheral sections, of a camera system of a first embodiment of the present invention.
Figure 4:
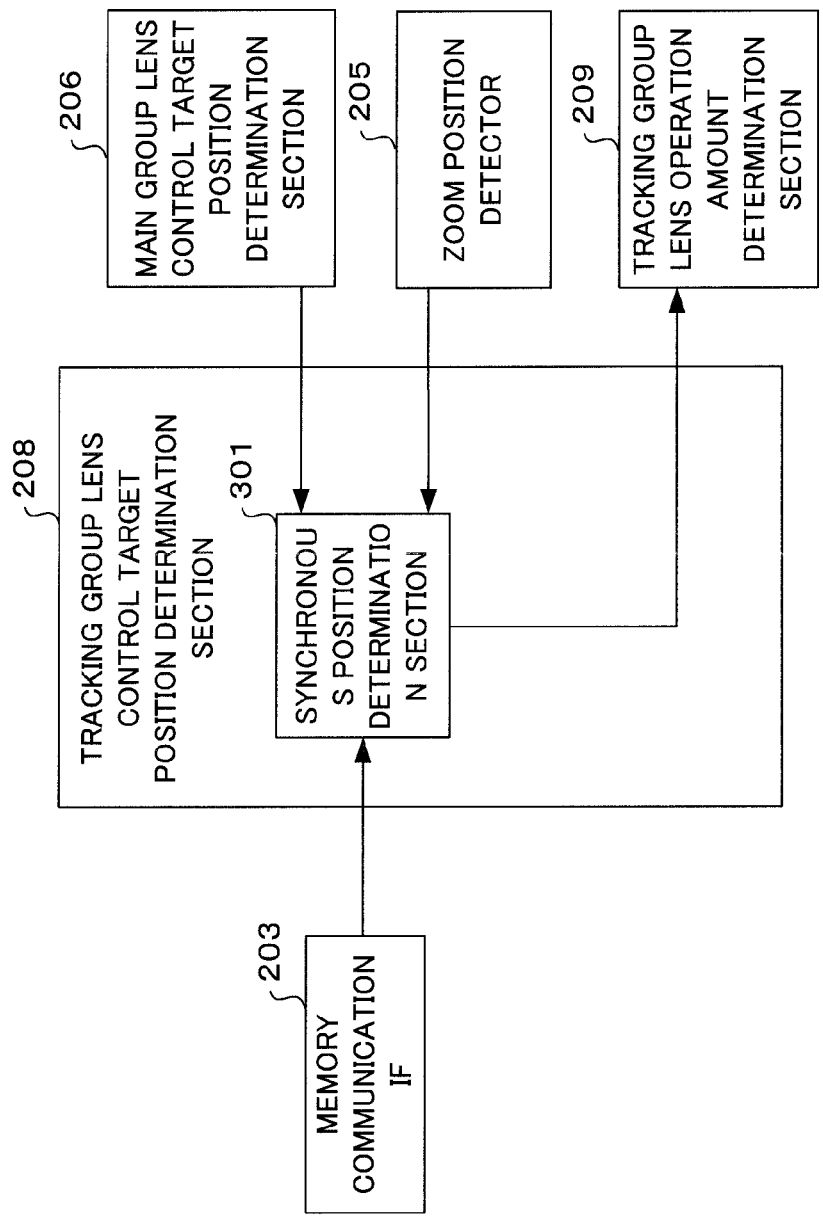
FIG. 4 is a block diagram showing detailed electrical structure of a tracking group lens control target position determination section, and its peripheral sections, of a camera system of a first embodiment of the present invention.
Figure 12:
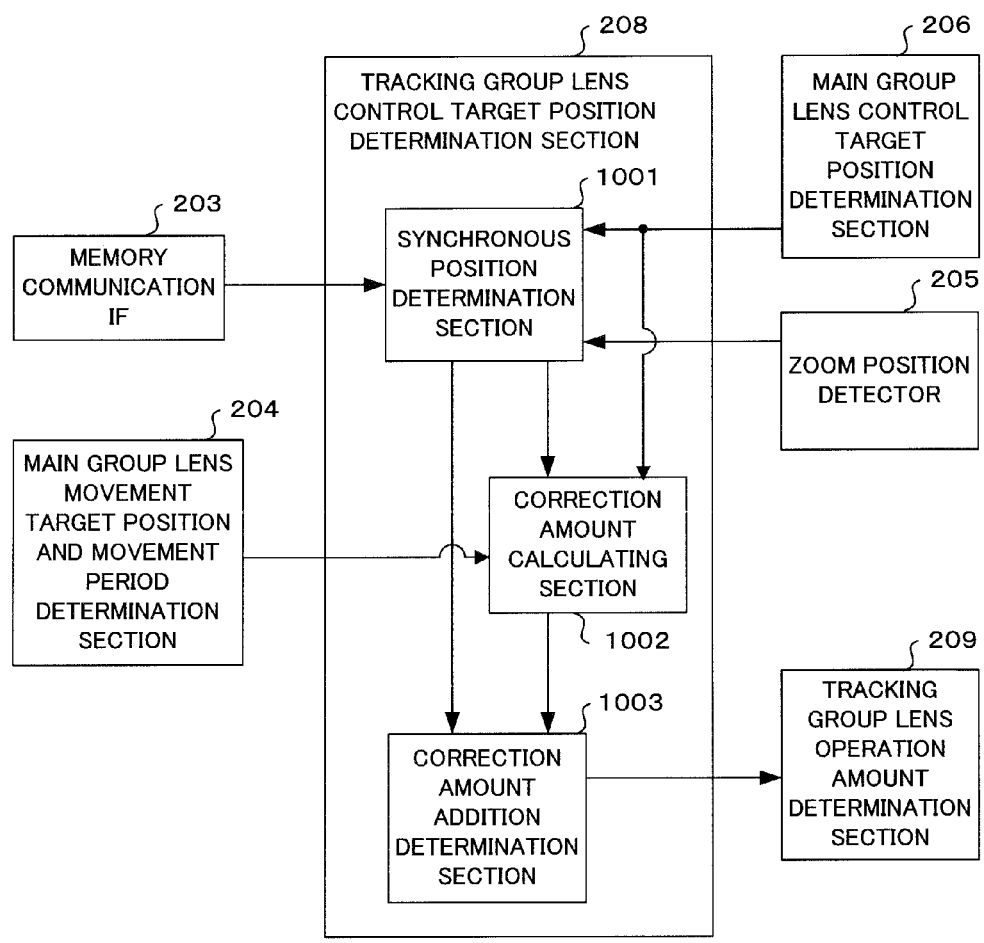
FIG. 12 is a block diagram showing detailed electrical structure of a tracking group lens control target position determination section, and its peripheral sections, of a camera system of a second embodiment of the present invention.

The structure of the second embodiment of the present invention is the same as the block diagrams of FIG. 1 to FIG. 3 relating to the first embodiment, with the block diagram shown in FIG. 4 being replaced by the block diagram shown in FIG. 12. The flowcharts shown in FIG. 5 and FIG. 7 relating to the first embodiment also the same, with the flowchart shown in FIG. 6 being replaced with the flowchart shown in FIG. 13, and the flowchart shown in FIG. 8 being replaced with the flowchart showing in FIG. 14. For block diagrams showing structure and flowcharts showing operation, when they are the same as first embodiment detailed description will be omitted.

FIG. 12 is a detailed block diagram of the tracking group lens control target position determination section 208 for the case of carrying out the second control method. Compared to case of the first control method shown in FIG. 4, a point of difference is that output of the main group lens movement target position and movement determination section 204 is connected to the tracking group lens control target position determination section 208. The fact that a correction amount calculation section 1002 and a correction amount addition determination section 1003 are provided within the tracking group lens control target position determination section 208 is also different.

The tracking group lens control target position determination section 208 reads out data for obtaining target position of the tracking group lens from focal length and target position of the main group lens, that are held in the non-volatile memory 23, at the time of device start up, via the memory communication interface 203.

Also, the tracking group lens control target position determination section 208 also comprises a synchronous position determination section 1001 for determining target position (synchronous position) of the tracking group lens corresponding to main group lens control target position and focal length, the correction amount calculation section 1002 for calculating correction amount for the synchronous position that has been determined by the synchronous position determination section and 1001 when the focal length notified from the zoom position detector 205 has changed, and the correction amount addition determination section 1003 for determining whether to output the synchronous position that was calculated by the synchronous position determination section and 1001 or output a value derived by adding a correction amount that has been calculated by the correction amount calculation section 1002 to the synchronous position, depending on whether not there has been change in the focal length.

Figure 15:
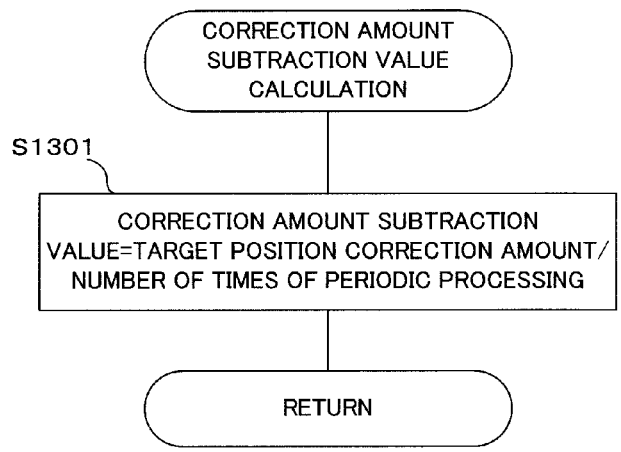
FIG. 15 is a flowchart showing operation of correction amount subtraction value calculation of the camera system of the second embodiment of the present invention.

Next, operation in a case where control drive of the main group lens 14 and the tracking group lens 15 is performed using the second control method will be described using the flowcharts shown in FIG. 13 to FIG. 15. Description will also include switching between the first control method and the second control method in the event that the focal length has been changed.

Figure 7:
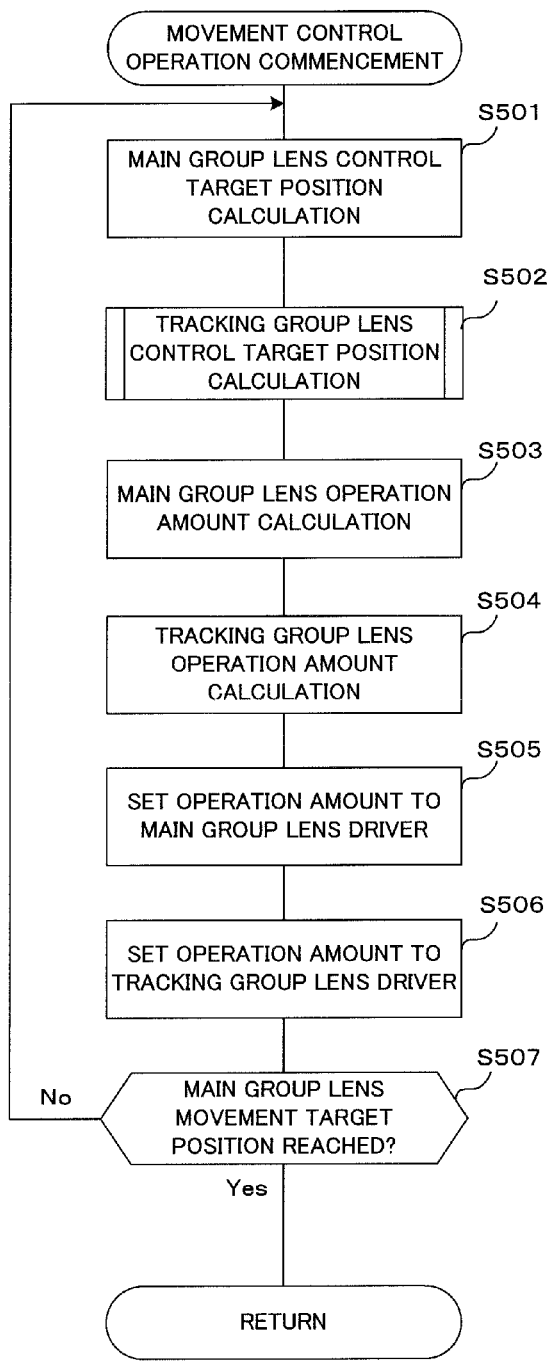
FIG. 7 is a flowchart showing operation of movement control of the camera system of the first embodiment of the present invention.
Figure 8:
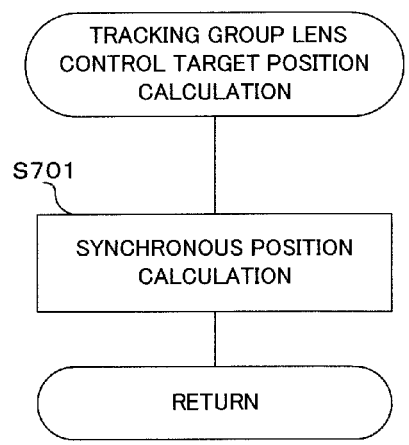
FIG. 8 is a flowchart showing operation of tracking group lens control target position calculation of the camera system of the first embodiment of the present invention.
Figure 13:
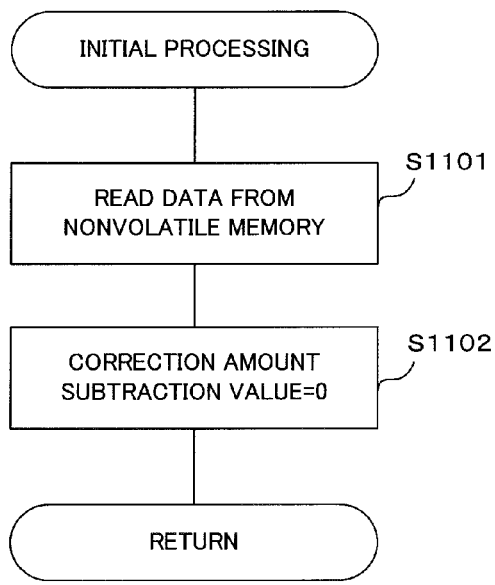
FIG. 13 is a flowchart showing operation of initial processing of the camera system of the second embodiment of the present invention.

Main flow of this embodiment is the same as FIG. 5, the initial processing shown in FIG. 6 replaced by the flowchart shown in FIG. 13, the movement control operation shown in FIG. 7 is the same, and the tracking group lens control target position calculation shown in FIG. 8 is replaced with the flowchart of FIG. 14.

In the processing flow shown in FIG. 13, first data readout from the nonvolatile memory 23 is carried out (S1101). Here, the lens controller 21 reads out characteristic data for obtaining target position of the tracking group lens 15 based on focal length and control target position of the main group lens 14 from the nonvolatile memory 23.

If data read out has been carried out in step S1101, next a correction amount subtraction value is set to 0 (S1102). The correction amount subtraction value is an amount for correcting control target position, in order to prevent abrupt change in acceleration due to abrupt change in target position, when the control target position of the tracking group lens 15 has been calculated. Details of this correction amount subtraction value will be described later (refer to S1204-S1207 in FIG. 14).

Once the correction amount has been made 0 in step S1102, the originating main flow is returned to.

Next, operation for tracking group lens target position calculation will be described using the flowchart shown in FIG. 14. This flow is carried out by the tracking group lens control target position determination section 208. Also, the flowchart of FIG. 14 is for executing the processing of step S502 in FIG. 7 and is shown instead of the flowchart of FIG. 8. Processing up to step S501 in the flowchart of FIG. 7 is the same as the first control method.

If the flow for tracking group lens target position calculation shown in FIG. 14 is entered, first calculation of synchronous position is carried out (S1201). Here, the control target position (synchronous position) of the tracking group lens 15 is calculated using data that was read out from the nonvolatile memory 23 at the time of start up, based on control target position of the main group lens 14 that has been obtained by the main group lens control target position calculation section 206 and the current focal length that has been detected by the zoom position detector 205.

If the synchronous position has been calculated in step S1201, it is next determined whether focal length is changed or whether or not the target position correction amount is not 0 (S1202). Here, it is determined whether the focal length has changed from the time the previous processing was executed, or whether or not correction amount is other than 0. If the result of this determination is that determination conditions are satisfied, processing advances to step S1204, while if the focal length has not changed from when the previous processing was executed and also correction amount is also 0, processing advances to step S1203.

If the result of determination in step S1202 was that determination conditions were satisfied, it is determined whether or not correction amount calculation value is 0 (S1204). Since the correction amount subtraction value was made 0 in step S1102, in the case of initial determination in step S1204 the correction amount subtraction value will be 0. In step S1206 that will be described later, there may be cases where the correction amount subtraction value is set to a value other than 0.

If the result of determination in step S1204 is that the correction amount subtraction value is 0, "target position correction amount=previous tracking group lens periodic target position–tracking group lens synchronous position" is calculated (S1205). Here, target position correction amount is made a difference between the tracking group lens control target position that was set by the previous periodic processing and the synchronous position that was obtained by the processing of step S1201, and this is made the correction amount initial value.

If the target position correction amount has been calculated in step S1205, next a correction amount subtraction value (α) is calculated (S1206). The correction amount subtraction value (α) is a value that makes an absolute value of correction amount smaller every periodic processing. Details will be described later using the flowchart shown in FIG. 15.

Once the correction amount subtraction value has been calculated in step S1206, next "target position correction amount=target position correction amount–correction amount subtraction value" is calculated (S1207). Here, the correction amount subtraction value that was calculated in step S1206 is subtracted from the target position correction amount that was calculated in step S1205.

If the target position correction amount has been calculated in step S1207, or if the result of determination in step S1204 was that the correction amount subtraction value was not 0, next "tracking group lens target position=tracking group lens synchronous position+target position correction amount" is calculated (S1208). Here, the control target position of the tracking group lens 15 is made a position derived by adding the correction amount that was obtained in step S1207 to the synchronous position that was obtained in step S1201. Drive control for the tracking group lens 15 is carried out in steps S504 and S506 (refer to FIG. 7) using the tracking group lens target position that has been calculated here.

If the tracking group lens target position has been calculated in step S1208, next, as a calculation condition determination step for newly calculating target position correction amount, it is determined whether or not a condition |target position correction amount|≥|correction amount subtraction value| exists (S1209). Here, absolute values of the correction amount that was obtained in step S1207 and the correction amount subtraction value that was obtained in step S1206 are compared.

Figure 16:
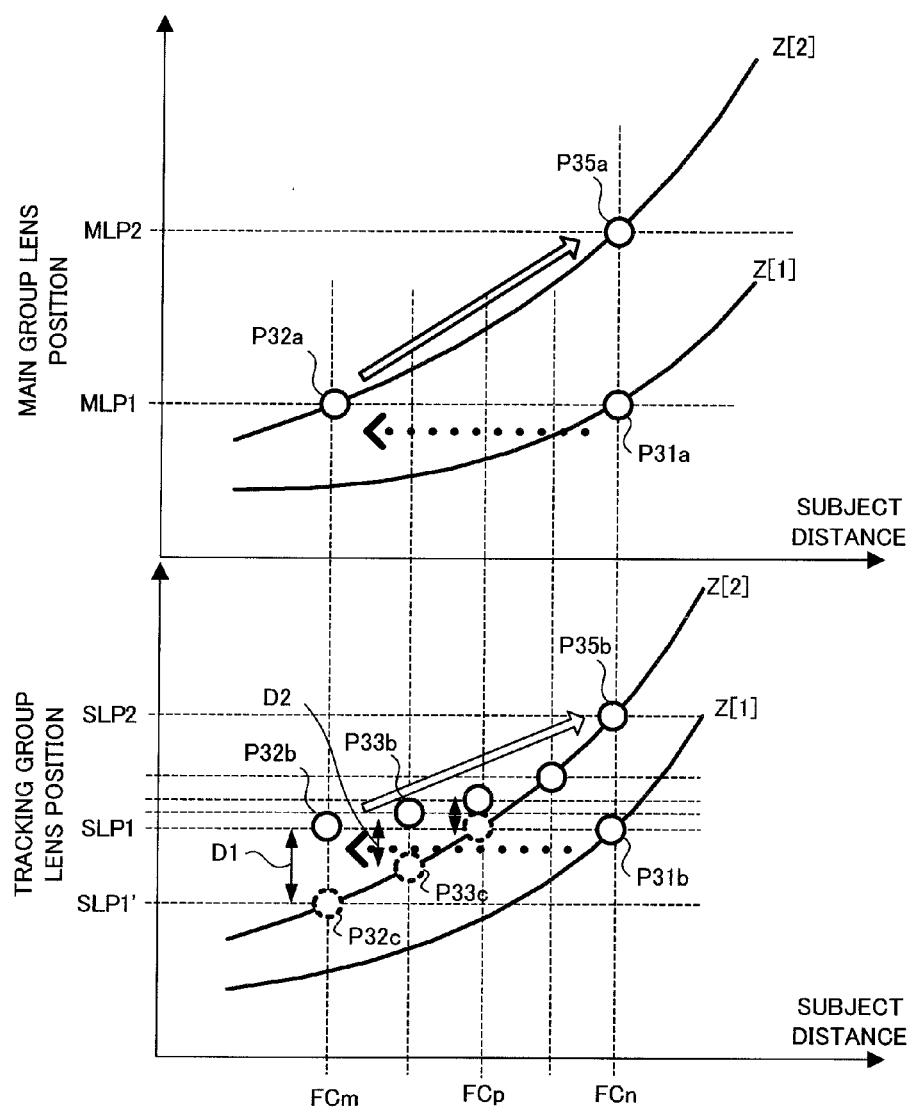
FIG. 16 is a graph showing a positional relationship between main group lenses and tracking group lenses, when carrying out movement control of the focus lens group, in a case where focal length is changed, in the camera system of the second embodiment of the present invention.

If the result of determination in step S1209 is that absolute value of target position correction amount is larger than absolute value of correction amount subtraction value, then there is a transition to the next step for calculating "target position correction amount=target position correction amount–correction amount subtraction value" (S1210). Here, the target position correction amount that is used in the flow for tracking group lens target position calculation that will be carried out the next time is changed using the correction amount subtraction value. As shown in FIG. 16, which will be described later, the target position correction amount is made smaller every fixed period.

On the other hand, if the result of determination in step S1209 was that absolute value of target position correction amount was smaller, then as the next step there is a transition to a step for newly setting target position correction amount, and target position correction amount is set to 0 and correction amount subtraction value is set to 0 (S1211). Here, a value for correcting control target position of the tracking group lens 15 in the next periodic processing is obtained.

If the result of determination in step S1202 was that the focal length has not changed from the previous processing, and that target position correction amount is 0, next the tracking group lens target position is set. In this step "tracking group lens target position=tracking group lens synchronous position" is carried out (S1203). Processing for obtaining tracking group lens synchronous position is the same as S701 in FIG. 8, and so detailed description will be omitted.

Either processing for obtaining target position correction amount is carried out in step S1210 or target position correction amount is set to 0 in step S1211, and processing to set correction amount subtraction value to 0 is carried out. If the processing of step S1210 has been carried out or if processing of step S1211 has been carried out, the flow for tracking group lens target position calculation is completed and the originating flow (S503 in FIG. 7) is returned to. Also, if the tracking group lens target position is made the tracking group lens synchronous position in step S1203, then similarly the flow for tracking group lens target position calculation is completed and the originating flow (S503 in FIG. 7) is returned to.

Next, operation for correction amount subtraction value calculation in step S1206 will be described using FIG. 15. If this flow is entered, "correction amount subtraction value=target position correction amount/number of times of periodic processing" is calculated (S1301). Here, correction amount subtraction value is computed using equation (1) below.

$$\text{Correction Amount Subtraction Value}(\alpha) = \text{Correction amount initial value}/Tm \quad (1)$$

Here, Tm: number of times of periodic processing until movement to focal length position before focal length change that was obtained in advance by the main group lens movement target position and movement period determination section 204.

If the correction amount subtraction value has been obtained in step S1301, the originating flow is returned to.

Next, drive control for the main group lens 14 and the tracking group lens 15 when a zoom operation is carried out and the focal length Z[1] is changed to focal length Z[2] will be described using FIG. 16.

In FIG. 16, a position hold operation of the main group lens 14 at MLP1 (position P31a) is carried out at the time of focal length Z[1]. At this time, the tracking group lens 15 is subjected to a position hold operation at SLP1 (position P31b). A case where, from this state, the focal length is changed from Z[1] to Z[2] will be considered. The zoom position detector 205 detects that focal length has changed to Z[2]. If focal length is changed to Z[2] with the position of the main group lens 14 being MLP1 (change from P31a→P32a), the corresponding position of the tracking group lens 15 becomes SLP1' (position P32c).

However, after the tracking group lens 15 has actually been moved to SLP1' (position P32c), if there is movement to SLP2 (position P35b), which is the movement target position, then as was described using FIG. 11 abrupt change in acceleration occurs, which is considered to affect shooting conditions, and also cause noise and vibration. Therefore, with the second control method adopted by this embodiment, there is movement from SLP1 (position P32b) to SLP2 (position P35d) which is the movement target position, without moving to SLP1' (position P32c). For this reason the correction amount subtraction value is added to the control target position (synchronous position) that was calculated with the first control method. Specifically, the tracking group lens control target position is made a position that is derived by adding the correction amount subtraction value to the control target position (synchronous position) (SLP1') that was calculated with the first control method.

Calculation of this tracking group lens control target position will now be described. First, when carrying out movement processing of the main group lens 14 from MLP1 to the movement target position MLP2 (movement processing from P32a to P35a), a number of times of periodic processing Tm required for the main group lens 14 to move from MLP1 to MLP2 is obtained.

If the number of times of periodic processing has been obtained, then from this, correction amount subtraction value and tracking group lens control target position for periodic processing are obtained using equations (2) and (3) below.

$$\text{correction amount subtraction value} = (SLP1 - SLP1')/Tm \quad (2)$$

$$\text{tracking group lens control target position} = SLP1' + (SLP1 - SLP1') + SLP1 - SLP1')/Tm \quad (3)$$

If determination of control target position of the tracking group lens is similarly performed using the second control method in the next and subsequent periodic processing as well, then as shown in FIG. 16 the difference between the tracking group lens control target position and the synchronous position becomes smaller. Specifically, initially, for subject distance FCm the synchronous position is P32c, a control target position that has been corrected is P32b, and a difference at this time is D1. In the next periodic processing, synchronous position is P33c while a corrected control target position is P33b, and a difference at this time is D2. Subsequently, a difference between the synchronous position and a control target position that has been corrected becomes smaller every time periodic processing is carried out. Then, when the main group lens 14 reaches the movement target position MLP2, the control target position of the tracking group lens 15 becomes control target position SLP2 of the tracking group lens corresponding to MLP2 and the focal length Z[2].

In this way, with the second embodiment of the present invention, when focal length has been changed (determination in S1202 of FIG. 14), it is possible to carry out positional control of the tracking group lens 15 without abrupt acceleration change and to suppress the detrimental effects on shooting conditions and the occurrence of noise and vibration, by carrying out processing to switch a control method of the tracking group lens 15 from first control (S1203 in FIG. 14) to second control (S1204-S1211) in a period until the main group lens 14 reaches a movement target position as a result of zoom tracking.

Also, with this embodiment, the lens controller 21 references first and second focus lens position characteristic data that has been stored in the memory (refer to nonvolatile memory 23) and sets first and second focus instruction positions determined based on the referenced first and second focus position characteristic data to magnification lens position that has been detected by the magnification lens position detector (refer to zoom position sensor 20). The lens controller 21 therefore functions as a first focus controller for respectively outputting first and second drive amounts to the focus drivers, based on the first and second focus instruction positions (refer to S1203 in FIG. 14, and FIG. 7 and FIG. 10).

Also, with this embodiment, the lens controller 21 references first and second focus lens position characteristic data that has been stored in the memory for magnification lens position that has been detected by the magnification lens position detector, and calculates respective first and second drive amounts for the focus drivers, based on first and second focus instruction positions that are determined based on the referenced first and second focus position characteristic data. The lens controller 21 also functions as a second focus controller for calculating second focus instruction position using different means to the first focus controller, and outputting a third drive amount to the plurality of focus drivers (refer to S1204-S1211 in FIG. 14).

With this embodiment, the lens controller 21 functions as a focus controller for selecting one of either first and second focus controllers, and regarding the focus controllers, a selection section selects the second focus controller in a case where magnification factor of the magnification lens group has been changed in accordance with operation amount using the zoom operation input section, but selects the first focus controller in a case where the magnification factor of the magnification lens group is not changed in accordance with operation amount using the zoom operation input section (refer to the determination in step S1202 of FIG. 14).

Next, a modified example of the second embodiment of the present invention will be described using FIG. 17 to FIG. 19. In the second embodiment, a correction amount subtraction value was calculated using equation (1), and an upper limit value for correction amount subtraction value was not provided. With this modified example, however, an upper limit value is provided for the correction amount subtraction value.

The upper limit value is provided for the correction amount subtraction value for the following reasons. Depending on the optical design of a lens barrel used in the present invention, a case can be considered where a distance by which the tracking group lens 15 is moved will be extremely long compared to a small movement distance for zoom tracking drive of the main group lens 14 after the focal length has been changed. In this type of situation, if the correction amount subtraction value is corrected using equation (1) above, the correction amount subtraction value becomes large and acceleration of the tracking group lens 15 becomes large, and it is not possible to achieve the effect of suppressing abrupt acceleration change or the effect of reducing noise and vibration.

With the modified example, therefore, an upper limit value for correction amount subtraction value ($\alpha$) is set in advance in order to avoid the correction amount subtraction value becoming large and thus acceleration becoming large. Processing is then carried out to clip at the upper limit value in a case here the correction amount subtraction value would exceed the upper limit value. The upper limit value is not limiting, and a lower limit value may be set in advance, and processing to clip at the lower limit value carried out in the event that the correction amount subtraction value falls below the lower limit value. By providing the lower limit value, it is possible for the tracking group lens 15 to reach the movement target position rapidly but without abrupt acceleration change taking place.

Next, operation of this modified example will be described using the flowchart shown in FIG. 17. With this modified example, the flowchart for correction amount calculation value calculation that was shown in FIG. 15 is replaced with the flowchart shown in FIG. 17, and other flowcharts are the same as for the second embodiment.

Figure 17:
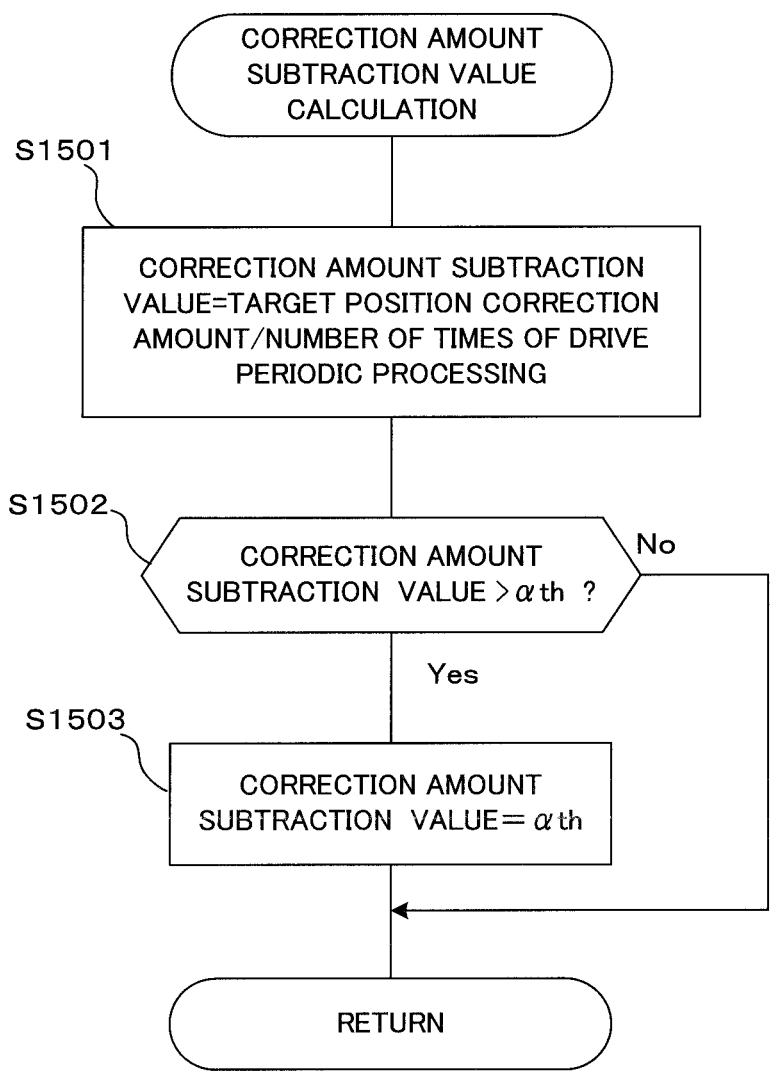
FIG. 17 is a flowchart showing a modified example of operation of correction amount subtraction value calculation of the camera system of the second embodiment of the present invention.

If the flow for correction amount subtraction value calculation of FIG. 17 is entered, first, processing to calculate the correction amount subtraction value is carried out. This processing is for carrying out calculation of "correction amount calculation value=target position correction amount/number of times of drive periodic processing" (S1501). The target position correction amount is calculated in step S1210 (refer to FIG. 14), and so this value is divided by the number of times of drive periodic processing.

If the correction amount subtraction value has been obtained in step S1501, next determination processing is carried out for the correction amount subtraction value. This processing determines whether or not the correction amount subtraction value >$\alpha$th (S1502). Here, it is determined if the correction amount subtraction value has not exceeded the upper limit value ($\alpha$th) that has been set in advance.

If the result of determination in step S1502 is that the correction amount subtraction value is larger than the upper limit value $\alpha$th, then the correction amount subtraction value is set to $\alpha$th (S1503). In this way the correction amount subtraction value does not become larger than the upper limit value $\alpha$th.

If the correction amount subtraction value has been set to $\alpha$th in step S1503, or if the result of determination in step S1502 was that the correction amount subtraction value was not larger than the upper limit value $\alpha$th, the flow for correction amount subtraction value calculation is completed and the originating flow is returned to (S1207 in FIG. 14). After that, the drive control for the main group lens 14 and the tracking group lens 15 is carried out, as has been described above.

Next, movement of the main group lens 14 and the tracking group lens 15 when the focal length has changed will be described using FIG. 18 and FIG. 19.

Before focal length change, the main group lens 14 is at MLP1 (position P41a) and the tracking group lens 15 is at SLP1 (position P41b). If focal length change is detected, a drive instruction is generated to make position MLP2 (position P44a), corresponding to the subject distance FCn before focal length change on the line of focal length Z[2], the movement target position for the main group lens 14. At this time, the main group lens movement target position and movement determination section 204 commences drive from MLP1 (position P41a) at time T0, and calculates a number of times that control target position is instructed to the main group lens 14 in a period until MLP2 (position P44a) is reached at time Tm.

Figure 18:
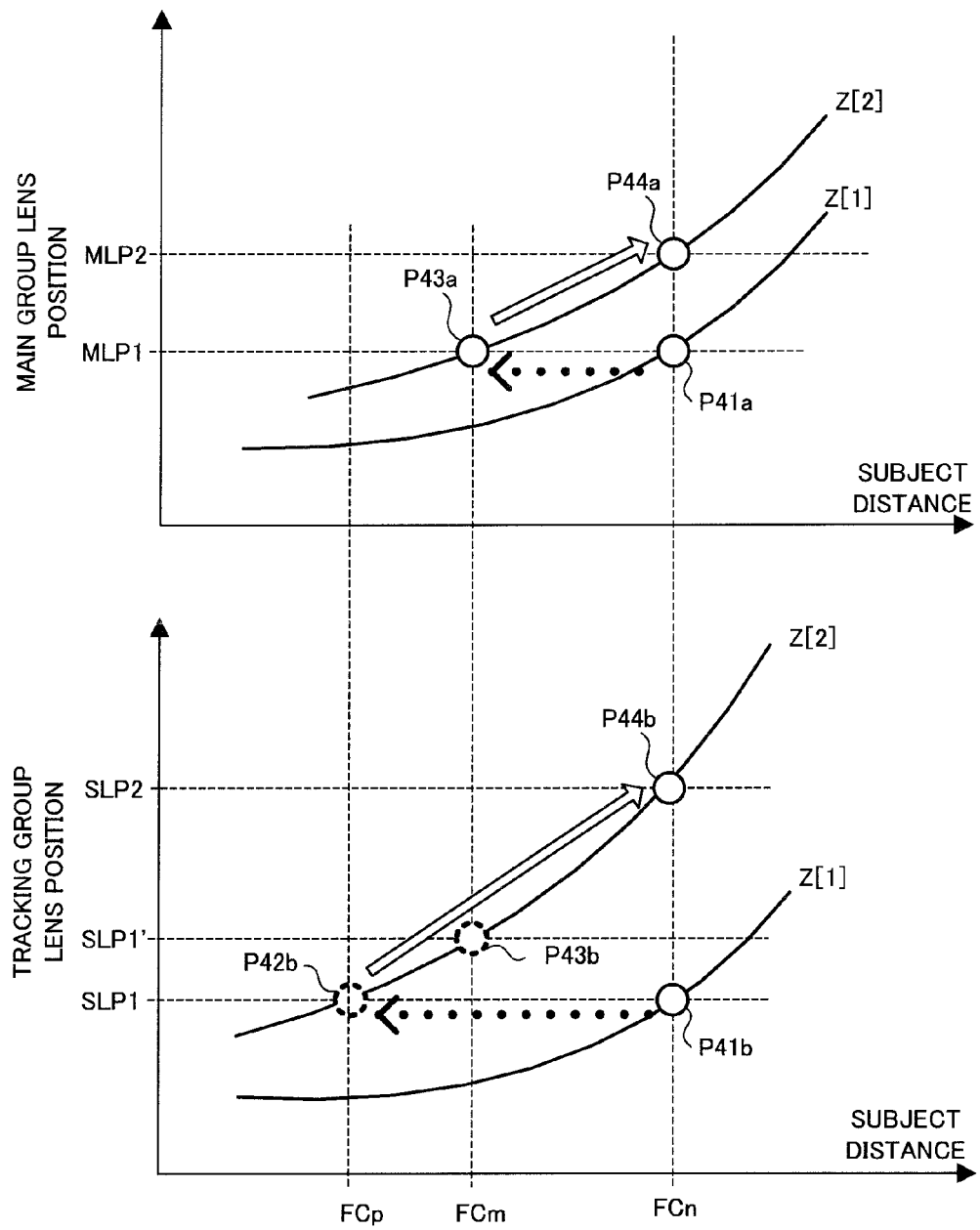
FIG. 18 is a graph showing change in position of a main group lens and a tracking group lens in a case where the modified example of correction amount subtraction value calculation has been applied, in the camera system of a modified example of the second embodiment of the present invention.

Conversely, there may be situations where a distance over which the tracking group lens 15 is moved from SLP1 (position 41b) to position SLP2 (position P44b) corresponding to the original subject distance FCn becomes significantly longer than the distance that the main group lens 14 moves from MLP1 to MLP2 (refer to FIG. 18). In this case, the correction amount subtraction value ($\alpha$) becomes extremely large. Therefore, with this modified example, by providing the upper limit value for correction amount subtraction value ($\alpha$), the tracking group lens 15 reaches SLP2 (position P44b) later than when the main group lens 14 reaches the movement target position.

Figure 19:
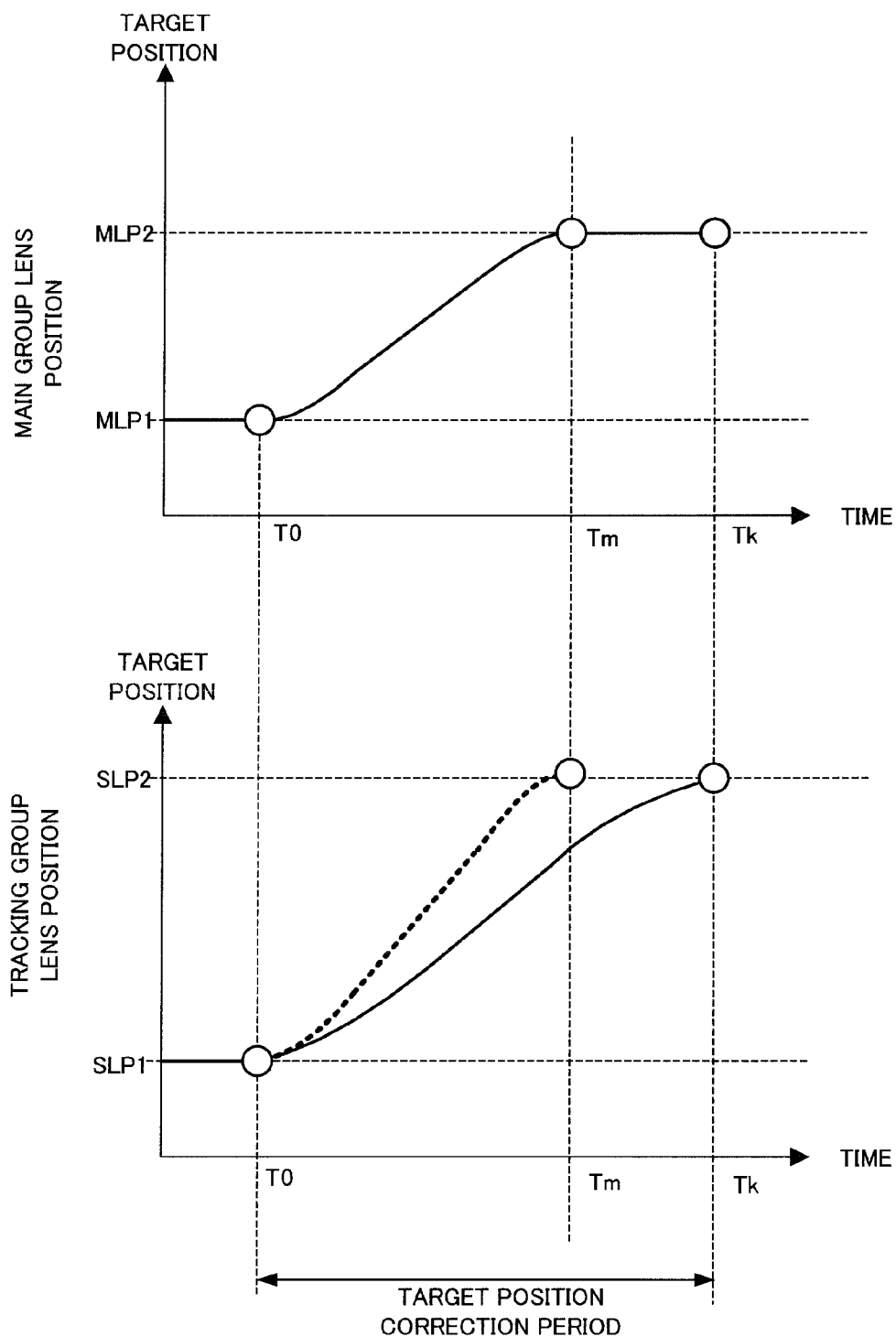
FIG. 19 is a graph showing change over time in position of a main group lens and a tracking group lens, in the camera system of a modified example of the second embodiment of the present invention.

The upper graph in FIG. 19 shows change over time of the position of the main group lens 14. The lower graph in FIG. 19 shows change over time of the position of the tracking group lens. The dashed line in the lower graph shows changeover time in position of the tracking group lens 15 in the case where an upper limit value is not set for the correction amount subtraction value ($\alpha$) using this modified example. In this case, at time TM when the main group lens 14 reaches the movement target position MLP2 (position P44a) the tracking group lens 15 also reaches the movement target position SLP2 (position P44b). However, the tracking group lens 15 has moved via SLP1 (P42b)→SLP1' (P43b) →SLP2 (P44b), and compared to the movement path MLP1 (P42a)→MLP2 (P44a) of the main group lens 14 the movement distance becomes long. As a result the tracking group lens 15 is subjected to abrupt acceleration, and noise and vibration occur.

On the other hand, the solid line in the lower graph of FIG. 19 shows change over time in position of the tracking group lens 15 in the case where an upper limit value has been set for the correction amount subtraction value (α) using this modified example. In the case of using this modified example, at time Tk after the main group lens 14 has reached the movement target position MLP2 (position P44a), the movement target position SLP2 (position P44b) for the tracking group lens 15 is reached. Specifically, with this modified example, since the correction amount subtraction value is set to the upper limit value αth, movement speed of the tracking group lens 15 is controlled, and as a result noise and vibration do not arise.

In this way, with this modified example, when a value (namely the correction amount subtraction value), obtained by dividing a position difference (namely the target position correction amount) between position of the tracking group lens 15 that is determined by position of the main group lens 14 before focal length change and the focal length, and position of the main group lens 14, that is determined by position instructed to the main group lens 14 after focal length change and the focal length, by a period until movement from before change in focal length to a focal length after change (namely the number of times of drive periodic processing) (refer to S1501 in FIG. 17), is larger that a predetermined upper limit value (αth) (S1502 Yes in FIG. 17), the correction amount subtraction value is made the upper limit value (αth) (refer to S1503 in FIG. 17). It is therefore possible to prevent abrupt acceleration at the time of driving the tracking group lens 15, and thus prevent noise and vibration.

With this modified example, the correction amount subtraction value was set to the upper limit value if the calculated value is larger than the upper limit value. However, this is not limiting, and the correction amount subtraction value may be set to a lower limit value if it is lower than a lower limit value.

As has been described above, with each of the embodiments and the modified example of the present invention, when driving the main group lens 14 and the tracking group lens 15 using a first control method, control target position for the main group lens is determined every fixed period, and control target position of the tracking group lens 15 is determined using this control target position (refer to FIG. 7 and FIG. 10). It is therefore possible to reduce computation amount and to carry out drive control rapidly.

Also, in the event that a magnification operation (zooming operation) has been carried out, drive control of the main group lens 14 and the tracking group lens 15 is carried out using a second control method. Specifically, the correction amount subtraction value is calculated (refer to S1206 in FIG. 14 and S1301 in FIG. 15), and tracking group lens target position is corrected using this correction amount subtraction value (refer to S1207 and S1208 in FIG. 14). As a result it is possible to carry out drive control at high speed, as well as prevent the occurrence of noise and vibration, even when a magnification operation has been carted out.

Each of the embodiments and the modified example of the present invention have been described for the case where there are two focus lens groups (main group lens 14 and tracking group lens 15). However, this is not limiting and the present invention may also be applied to a case where there are three or more focus lens groups.

Also, with each of the embodiments and the modified example of the present invention, when calculating correction amount subtraction value a division operation is carried out, but this is not limiting and it is also possible to calculate using another computational method.

Also, in each of the embodiments and the modified example of the present invention, as a positional control method for each focus lens group, positional control is carried out without acquiring position of each focus lens group (so called open control). However, this is not limiting, and it is also possible to arrange position sensors for every focus lens group, and to carry out positional control of each focus lens group using positional control carried out by acquiring position of each focus lens group, or so-called closed loop control (position feedback control).

Also, with each of the embodiments and modified example of the present invention, the AE processing section 33, AF processing section 34, image computing section 35, image processing section 36 and expansion section 44 may be constituted by hardware circuits, or some or all of the circuit functions may be implemented using software.

Further, with this embodiment, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC), tablet type computer, game console etc. In any event, it is possible to apply the present invention to any device that uses an optical system capable of driving a plurality of focus lens groups independently.

Also, with each of the embodiments and modified example of the present invention, description has been given for carrying out subtraction of target position correction amount using correction amount subtraction value immediately after a zoom tracking operation, but this is not limiting. For example, in the case where correction amount subtraction value becomes the lower limit value, processing for subtracting correction amount subtraction value from the target position correction amount may be commenced after a specified period has elapsed after commencement of a zoom tracking operation.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An optical instrument, comprising:
a plurality of focus lens groups, including first and second focus lenses capable of moving in an optical axis direction,
a magnification lens group that is capable of movement in the optical axis direction, for changing image magnification factor of a subject image by varying focal length using movement,
a plurality of focus drivers, including first and second focus drivers for respectively independently driving the first and second focus lenses within the plurality of focus lenses,
a zoom driver for driving the magnification lens group,
a zoom operation input section for supplying operation amount to the zoom drivers,
a magnification lens position detector for detecting position of the magnification lens group in the optical axis direction,
a memory for storing first and second focus position characteristic data representing relationships between a specified subject distance and positions at which the plurality of focus lens groups reach a focused state, for every position of the magnification lens group,
a first focus controller for respectively outputting first and second drive amounts for the focus drivers, based on first and second focus command positions determined based on first and second focus position characteristic data that has been stored in the memory for the magnification lens position detected by the magnification lens position detector,
a second focus controller for respectively calculating first and second drive amounts for focus drivers, based on first and second focus command positions determined based on first and second focus position characteristic data that has been stored in the memory for the magnification lens position detected by the magnification lens position detector, to obtain second focus instruction position by different means to the first focus controller, and outputting a third drive amount to the plurality of focus drivers, and
a lens controller having a selection section for selecting any one of the first and second focus controllers, wherein:
when the lens controller is changing focal length of the magnification lens group in accordance with operation amount from the zoom operation input section, the selection section selects the second focus controller, while when the focal length of the magnification lens group is not being changed in accordance with operation amount from the zoom operation input section the selection section selects the first focus controller;
the second focus instruction position is an instruction position derived by adding specified correction amount data to the second focus lens position characteristic data stored in the memory;
the correction amount data is obtained when the magnification lens group is moved as a result of driving the zoom drivers;
a period until movement to a focal length before image magnification ratio change is determined; and in the period until movement to the focal length before focal length after the focal length change, a correction amount subtraction value is subtracted from the correction amount data every specified period data so that an absolute value of the correction amount becomes smaller.

2. The optical instrument of claim 1 wherein:
the correction amount subtraction value is calculated by dividing a difference between position of a second focus lens, determined by position of a first focus lens before focal length change and focal length, and position instructed to the first focus lens, determined by position instructed to the first focus lens after focal length change and focal length, by a period until movement to focal length before focal length change, after the focal length change.

3. The optical instrument of claim 1 wherein:
the correction amount subtraction value, when a value, obtained by dividing a difference between position of a second focus lens, determined by position of a first focus lens before focal length change and focal length, and position instructed to the first focus lens, determined by position instructed to the first focus lens after focal length change and focal length, by a period until movement to focal length before focal length change, after the focal length change, is larger than a predetermined upper limit value, or is smaller than a predetermined lower limit value, is respectively made the upper limit value or the lower limit value.

4. A lens control method for an optical instrument, the optical instrument comprising a plurality of focus lens groups including first and second focus lenses capable of moving in an optical axis direction, a magnification lens group that is capable of movement in the optical axis direction, for changing focal length of a subject image, a plurality of focus drivers, including first and second focus drivers for respectively independently driving the first and second focus lenses within the plurality of focus lenses, a zoom drivers for driving the magnification lens group, a zoom operation input section for supplying operation amount to the zoom drivers, a magnification lens position detector for detecting position of the magnification lens group in the optical axis direction, and a memory for storing first and second focus position characteristic data representing relationships between a specified subject distance and positions at which the plurality of focus lens groups reach a focused state, for every position of the magnification lens group, the lens control method comprising:
outputting first and second drive amounts for the focus driver, based on first and second focus command positions determined based on first and second focus position characteristic data that has been stored in the memory for the magnification lens position detected by the magnification lens position detector, and
calculating first and second drive amounts for the focus drivers, based on first and second focus command positions determined based on first and second focus position characteristic data that has been stored in the memory for the magnification lens position detected by the magnification lens position detector, to obtain a second focus instruction position by different means than the act of outputting first and second drive amounts, and outputting a third drive amount for the plurality of focus drivers, and wherein:
when image magnification factor of the magnification lens group is being changed in accordance with operation amount from the zoom operation input section the second focus control step is executed, while when image magnification factor of the magnification lens group is not being changed in accordance with operation amount from the zoom operation input section the first focus control step is executed;

the second focus instruction position is an instruction position derived by adding specified correction amount data to the second focus lens position characteristic data stored in the memory;

the correction amount data is obtained when the magnification lens group is moved as a result of driving the zoom drivers;

a period until movement to a focal length before image magnification ratio change is determined; and in the period until movement to the focal length before focal length after the focal length change, a correction amount subtraction value is subtracted from the correction amount data every specified period data so that an absolute value of the correction amount becomes smaller.

* * * * *

UNITED STATES PATENT AND TRADEMARK OFFICE
CERTIFICATE OF CORRECTION

PATENT NO. : 9,658,428 B2
APPLICATION NO. : 14/946221
DATED : May 23, 2017
INVENTOR(S) : Kazuo Watanabe and Keita Imai Page 1 of 1

It is certified that error appears in the above-identified patent and that said Letters Patent is hereby corrected as shown below:

On the Title Page

Item (71) Applicant, should be corrected as shown below:
Replace: "Olympus Corporation, Shibuya-ku, Tokyo (JP)"
With: -- Olympus Corporation, Hachioji-shi, Tokyo (JP) --.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*